US011048318B2

(12) United States Patent
Sebot et al.

(10) Patent No.: US 11,048,318 B2
(45) Date of Patent: Jun. 29, 2021

(54) REDUCING MICROPROCESSOR POWER WITH MINIMAL PERFORMANCE IMPACT BY DYNAMICALLY ADAPTING RUNTIME OPERATING CONFIGURATIONS USING MACHINE LEARNING

(71) Applicant: Intel Corporation, Santa Clara, CA (US)

(72) Inventors: Julien Sebot, Portland, OR (US); Rangeen Basu Roy Chowdhury, Beaverton, OR (US); Rustam Miftakhutdinov, Hillsboro, OR (US); Stephen J. Tarsa, Cambridge, MA (US); Gautham N. Chinya, Sunnyvale, CA (US); Eric Donkoh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 91 days.

(21) Appl. No.: 16/370,572

(22) Filed: Mar. 29, 2019

(65) Prior Publication Data

US 2020/0183482 A1    Jun. 11, 2020

Related U.S. Application Data

(60) Provisional application No. 62/776,401, filed on Dec. 6, 2018.

(51) Int. Cl.
*G06F 1/26* (2006.01)
*G06F 1/32* (2019.01)
(Continued)

(52) U.S. Cl.
CPC ............ *G06F 1/3243* (2013.01); *G06F 1/324* (2013.01); *G06F 1/3228* (2013.01);
(Continued)

(58) Field of Classification Search
CPC .................................................. G06F 1/3243
See application file for complete search history.

(56) References Cited

U.S. PATENT DOCUMENTS

| 5,666,537 A    * | 9/1997 | Debnath .............. G06F 9/3861 |
| | | 713/322 |
| 2015/0198997 A1* | 7/2015 | Ting ..................... G06F 1/3243 |
| | | 713/320 |

(Continued)

OTHER PUBLICATIONS

Bahar R.I., et al., "Power and Energy Reduction Via Pipeline Balancing," Proceedings of the 28th Annual International Symposium on Computer Architecture (ISCA'01), 2001 IEEE Computer Society, Jun. 30-Jul. 4, 2001, 12 pages.

(Continued)

*Primary Examiner* — Mohammed H Rehman
(74) *Attorney, Agent, or Firm* — NDWE LLP

(57) ABSTRACT

A system on a chip is described that comprises a processor and a set of memory components that store instructions, which when executed by the processor cause the system on a chip to: generate, by a set of data collectors of a telemetry subsystem, a set of streams of telemetry metadata describing operation of the processor, forward one or more streams of telemetry metadata from the set of streams of telemetry metadata to a set of machine learning-driven adaptation decision models, receive, from the set of machine learning-driven adaptation decision models, a set of configuration parameters for controlling operation of the processor based on the one or more streams of telemetry metadata, and modify operation of the processor based on the set of configuration parameters.

18 Claims, 21 Drawing Sheets

(51) Int. Cl.
G06F 1/3234 (2019.01)
G06F 1/3296 (2019.01)
G06F 1/324 (2019.01)
G06N 20/00 (2019.01)
G06F 9/50 (2006.01)
G06N 5/04 (2006.01)
G06F 1/3228 (2019.01)

(52) U.S. Cl.
CPC ............ G06F 1/3296 (2013.01); G06F 9/505 (2013.01); G06N 5/04 (2013.01); G06N 20/00 (2019.01)

(56) References Cited

U.S. PATENT DOCUMENTS

| 2016/0301624 | A1* | 10/2016 | Gonzalez | G06F 9/5083 |
| 2016/0320825 | A1* | 11/2016 | Panda | G06F 1/3206 |
| 2019/0068464 | A1* | 2/2019 | Bernat | G06F 1/20 |
| 2019/0266484 | A1* | 8/2019 | Maluf | H04L 12/40 |
| 2020/0026570 | A1* | 1/2020 | Gottin | G06N 3/08 |

OTHER PUBLICATIONS

Chaparro P., et al., "Thermal-Aware Clustered Microarchitectures," Proceedings of the IEEE International Conference on Computer Design (ICCD'04), IEEE Computer Society, Oct. 11-13, 2004, 6 pages.

Dubach C., et al., "A Predictive Model for Dynamic Microarchitectural Adaptivity Control," Proceedings of the 43rd Annual IEEE/ACM International Symposium on Microarchitecture, Dec. 4-8, 2010, 12 pages.

Homayoun H., et al.,"Reducing Power in All Major CAM and SRAM-Based Processor Units via Centralized, Dynamic Resource Size Management," IEEE Transactions on Very Large Scale Integration (VLSI) Systems, IEEE 2010, Sep. 16, 2010, 14 pages.

Lee B.C., et al., "Efficiency Trends and Limits from Comprehensive Microarchitectural Adaptivity," Proceedings of the 13th International Conference on Architectural Support for Programming Languages and Operating Systems (ASPLOS'08), Mar. 1-5, 2008, 12 pages.

Li H., et al., "Deterministic Clock Gating for Microprocessor Power Reduction," Proceedings of the 9th International Symposium on High-Performance Computer Architecture (HPCA-9'03), Feb. 12, 2003, 10 pages.

Padmanabha S., et al., "Trace Based Phase Prediction for Tightly-Coupled Heterogeneous Cores," Proceedings of the 46th Annual IEEE/ACM International Symposium on Microarchitecture, Micro'46, Dec. 7-11, 2013, 12 pages.

Ponomarev D., et al., "Dynamic Resizing of Superscalar Datapath Components for Energy Efficiency," IEEE Transactions on Computers, 2006 IEEE Computer Society, vol. 55 (2), Feb. 2006, pp. 199-213.

Raghavendra R., et al., "No "Power" Struggles: Coordinated Multi-level Power Management for the Data Center," Architectural Support for Programming Languages and Operating Systems, ASPLOS'08, Mar. 1-5, 2008, 13 pages.

Ravi G.S., et al., "CHARSTAR: Clock Hierarchy Aware Resource Scaling in Tiled ARchitectures," Indian Science Congress Association ISCA '17, Jun. 24-28, 2017, 14 pages.

Tarsa S.J., et al., "Workload Prediction for Adaptive Power Scaling Using Deep Learning," 2014 IEEE International Conference on IC Design & Technology, ICICDT '14, May 28-30, 2014, 5 pages.

Vega A., et al., "Crank It Up or Dial It Down: Coordinated Multiprocessor Frequency and Folding Control," Proceedings of the 46th Annual IEEE/ACM International Symposium on Microarchitecture (Micro'46), Dec. 7-11, 2013, pp. 210-221.

* cited by examiner

| MODEL CLASS | GATING ACCURACY | # MODEL PARAMETERS | # IA INSTR. FOR INFERENCE |
|---|---|---|---|
| LARGE RANDOM FOREST | 83.9% | 10,240 | N/A |
| SMALL RANDOM FOREST | 79.4% | 320 | 190 |
| SMALL RANDOM FOREST | 78.4% | 386 | 779 |
| BINARY-PRECISION DNN | 78.0% | 386 | 90 |
| CHI2 SVM ENSEMBLE | 76.7% | 30,720 | N/A |
| CHI2 SVM | 75.4% | SCALES WITH TRAINING SET | N/A |
| LINEAR SVM | 75.2% | 26 | N/A |
| RBF SVM | 75.0% | SCALES WITH TRAINING SET | N/A |
| DNN VARIATION 2 | 74.6% | 1,352 | N/A |
| DNN VARIATION 3 | 73.9% | 1,352 | N/A |
| K-NEAREST NEIGHBORS | 69.2% | SCALES WITH TRAINING SET | N/A |

FIG. 5

REDUCING MICROPROCESSOR POWER WITH MINIMAL PERFORMANCE IMPACT BY DYNAMICALLY ADAPTING RUNTIME OPERATING CONFIGURATIONS USING MACHINE LEARNING

CROSS-REFERENCE TO RELATED APPLICATIONS

This application claims the benefit of U.S. Provisional Patent Application No. 62/776,401, filed Dec. 6, 2018.

TECHNICAL FIELD

Embodiments relate to power management of a system, and more particularly to a subsystem that improves power efficiency by adapting hardware to workload needs using predictive machine learning models.

BACKGROUND

Processors that adapt their hardware on-the-fly to application needs promise compelling performance and power gains with low complexity. Such adaptive processors tightly couple resources to fine-grained workload phase behaviors to capture optimization opportunities that are difficult for existing processors to exploit. To-date, hardware adaptation mechanisms have relied on expert-created rules and first-order statistical models to drive hardware changes at the microsecond timescale, resulting in performance that was inadequate for large-scale commercial deployment.

Heuristic control policies base adaptation on rules derived from expert analysis. Researchers have shown that heuristic accuracy is high only for coarse-grained predictions and misses up to 40% of optimization opportunities. In practice, heuristics derive rules from four or fewer data streams, a limit that is largely due to the high complexity of considering a larger number of data streams. However, models based on a small number of data streams do not perform well enough for deployment.

Statistical models based on correlation and linear regression provide poor performance for fine-grained workload prediction due the presence of non-linearities in workload behavior. Neural networks have been proposed to address this shortcoming; however, prior systems have assumed dedicated hardware support to meet adaptation timing requirements. This restricts those solutions to specific tasks and makes them unrealistic to deploy for arbitrary customer workloads at scale.

BRIEF DESCRIPTION OF THE DRAWINGS

The present invention is illustrated by way of example and not limitation in the figures of the accompanying drawings, in which like references indicate similar elements and in which:

FIG. 5 shows accuracies, number of model parameters (a proxy for memory footprint on a microcontroller of the telemetry system), and number of x86 micro-operations needed to generate a prediction (i.e., perform inference) for a variety of machine learning adaptation models, according to one example embodiment.

DETAILED DESCRIPTION

Overview

Adaptive hardware mechanisms are described herein that dynamically manage processor power at runtime, driven by a subsystem that serves as a general platform for machine learning chip/processor adaptation. In particular, two main adaptive mechanisms are described. A first adaptive mechanism manages a processor's backend resources by disabling out-of-order components and/or execution components when the processor/core is frontend bound and a second adaptive mechanism throttles the frontend by adjusting clock and voltage of the processor's/core's fetch and decode components when the processor/core is backend bound. In particular, adaptations are made based on a telemetry system that gathers metadata (sometimes referred to as "telemetry metadata") from across a system on a chip (SoC), and a microcontroller that executes one or more machine learning models installed in firmware of the microcontroller to drive changes to architecture configurations of the processor/core.

In addition to adaptive processor/core hardware, the machine learning-driven adaptation platform showcases several advantages. A first advantage is that the telemetry metadata provides general support for a variety of adaptation models. In particular, multiple streams of telemetry metadata are aggregated at a single convergence point where metadata sources are chosen that accurately accommodate a broad range of statistical models, even at the extremes of architecture behavior. Further, the telemetry system described herein contrasts with other systems that utilize a small number of expert-chosen, task-specific metadata streams routed to dedicated control circuitry for each adaptation task.

A second advantage is that the microcontroller firmware provides a flexible platform for installing different adaptation models and enables post-silicon modifications. In particular, machine learning adaptation models are executed as optimized code in microcontroller firmware. An adaption model for a specific task therefore requires no specialized hardware, can operate simultaneously alongside other models, and can be adjusted by updating firmware code (e.g., to optimize performance for individual applications or to support service-level agreements (SLAs) negotiated post-silicon).

Control hardware supporting existing machine learning adaptation models are task-specific, require specialized computation hardware, and enable only limited changes once deployed. In contrast, the system described herein demonstrates machine learning adaptation models that meet the strict requirements of real-world deployment on a platform that has the flexibility of software code and the design simplicity of a commercial-off-the-shelf (COTS) system.

Architecture for Adaptive Configuration

Infrastructure

Figure 1:
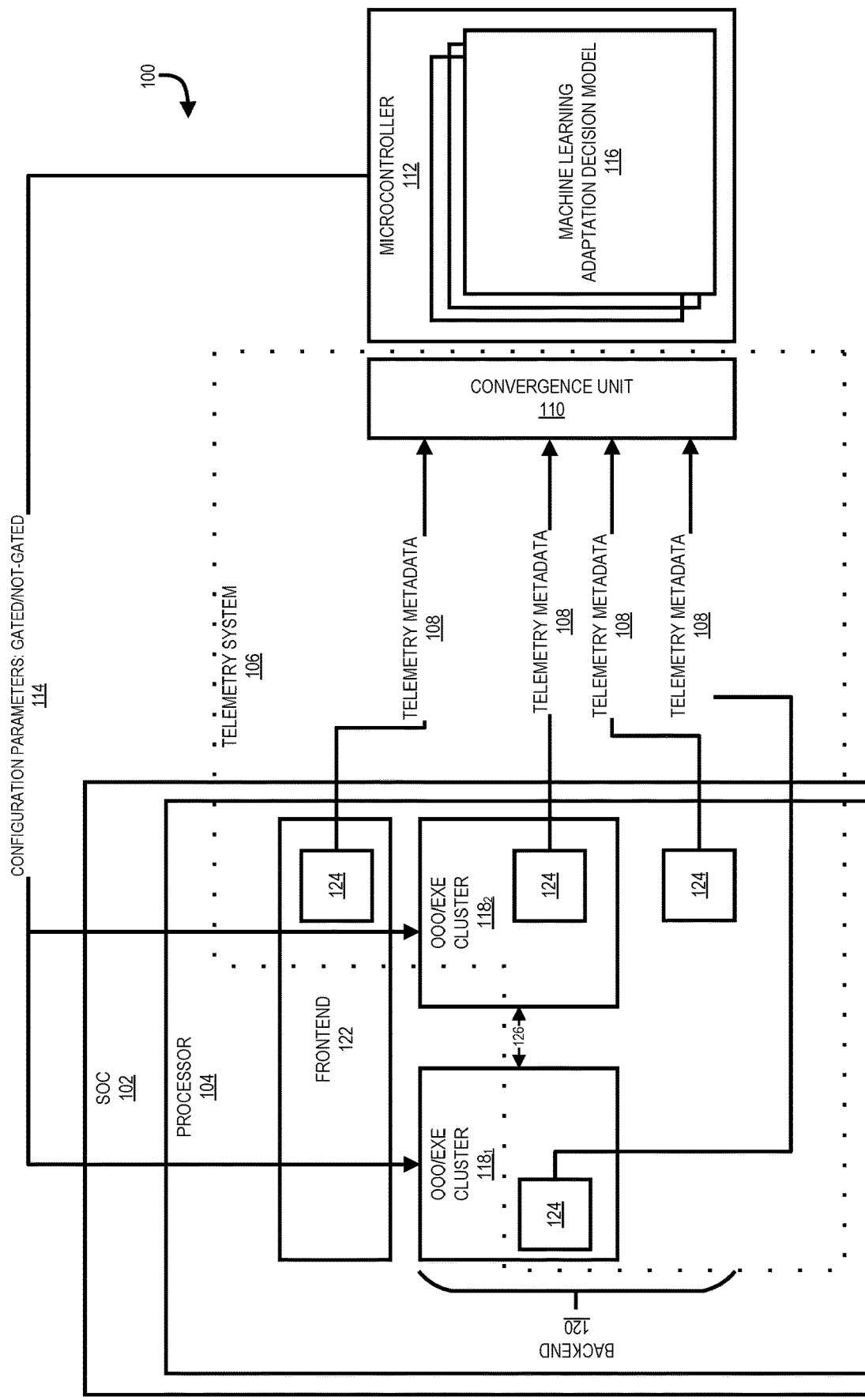
FIG. 1 shows a system, with a system on a chip (SoC) that includes a processor and two hardware structures, which may be used to support runtime SoC adaptations, according to one example embodiment.

FIG. 1 shows a machine learning-driven adaptation system 100, with a system on a chip (SoC) 102 that includes a processor 104. The system 100 additionally includes two hardware structures, which may be used to support runtime SoC 102 adaptations (e.g., cluster gating for the processor 104). The first structure is a telemetry system 106 that gathers telemetry metadata 108 throughout the SoC 102 via a set of data collectors 124 (e.g., counters) and aggregates the telemetry metadata 108 at a single convergence point (e.g., the convergence unit 110). The second structure is a microcontroller 112 that consumes the streams of telemetry metadata 108 and, in response to the telemetry metadata 108, emits configuration parameters 114 for the SoC's 102 architectural structures (e.g., the processor 104). As shown in FIG. 1, these configuration parameters 114 are fed to the SoC 102 for adjusting operation of the SoC 102, including power of various components of the processor 104, as will be described in greater detail below. In some embodiments, adaptation decisions, which are used for generation of the configuration parameters 114, are made in firmware of the microcontroller 112 by code that evaluates a trained set of machine learning adaptation decision models 116 of the microcontroller 112 using the telemetry metadata 108 as inputs.

Cluster-Gating

Figure 2:
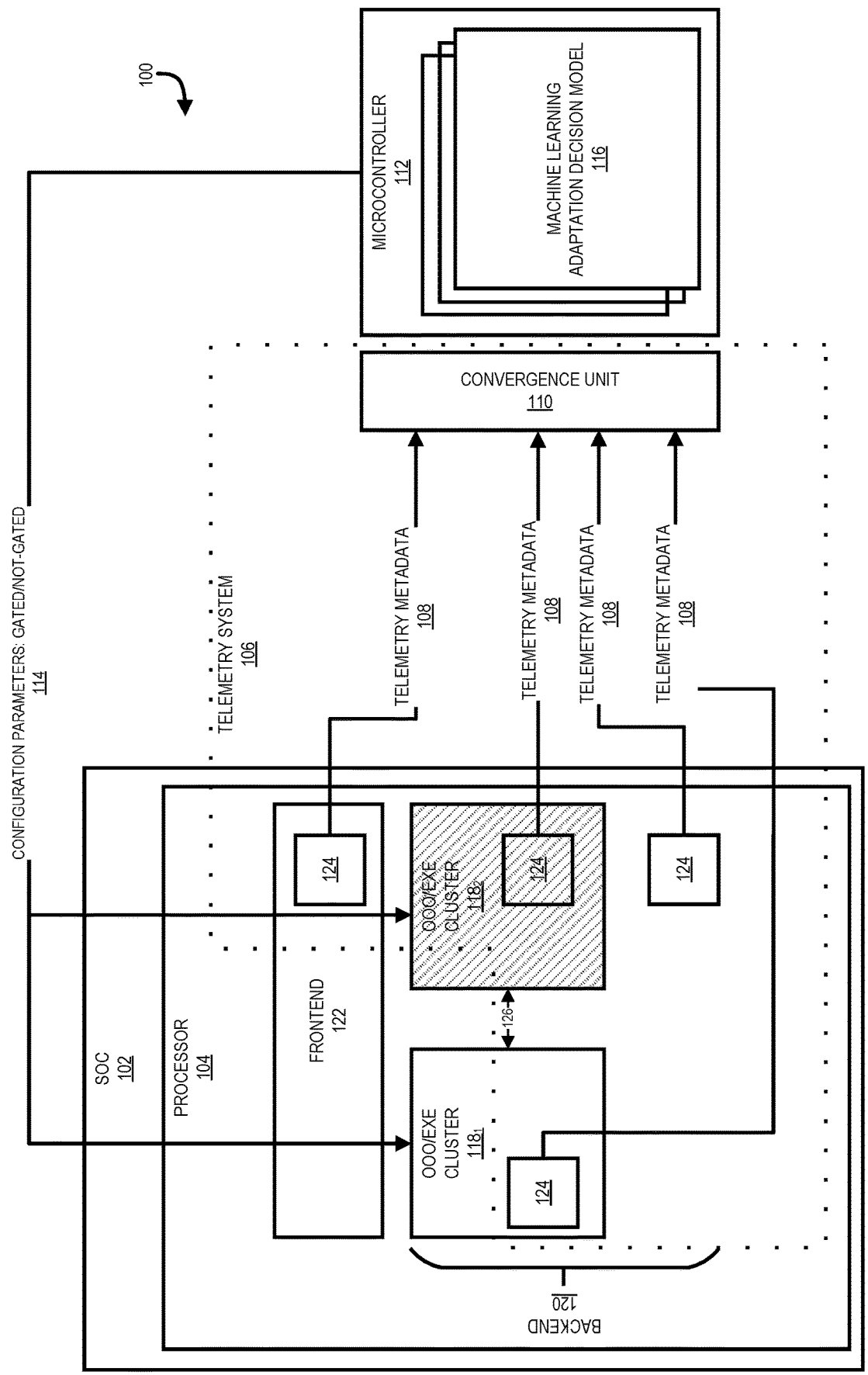
FIG. 2 shows enabled and disabled clusters in a processor, according to one example embodiment.

An out of order (OOO) cluster and/or execution (EXE) cluster 118 (sometimes referred to as OOO/EXE clusters 118 (e.g., OOO/EXE cluster $118_1$ and OOO/EXE cluster $118_2$) and/or processing elements 118), which are located in the backend 120 of the processor 104, are designed to be quickly enabled and disabled, including respective computation resources, based on the machine learning adaptation decision model 116 that predicts whether execution will be frontend bound or not (i.e., will be backend-bound). For example, as shown in FIG. 2, the OOO/EXE cluster $118_2$ may be disabled, including corresponding computation resources based on configuration parameters 114 from the microcontroller 112. As mentioned above, the microcontroller 112 may generate the configuration parameters 114 to cause the OOO/EXE cluster $118_2$ to be disabled in response to a prediction that execution in the processor 104 will not be frontend bound. Once the decision to deactivate/disable an OOO/EXE cluster 118 is made, instructions are steered from the processor's 104 frontend 122 to the remaining enabled OOO/EXE clusters 118, while disabled OOO/EXE clusters 118 are clock gated. For instance, in the example of FIG. 2 in which the OOO/EXE cluster $118_2$ is disabled, instructions are steered from the processor's 104 frontend 122 to the remaining enabled OOO/EXE cluster $118_1$. For disabled OOO/EXE clusters 118, a subset of hardware retaining critical state information remains powered and as a user program continues execution, that state is migrated to enabled OOO/EXE clusters 118 using a bypass 126. Once state resides in active/enabled OOO/EXE clusters 118, the associated register files of the inactive/disabled OOO/EXE clusters 118 are progressively clock gated.

In contrast to the above description, when the machine learning adaptation decision model 116 of the microcontroller 112 generates and forwards configuration parameters 114 to enable all OOO/EXE clusters, disabled OOO/EXE clusters 118 are ungated and instructions are immediately steered to all OOO/EXE clusters 118. State information needed by instructions running on recently-enabled OOO/EXE clusters 118 is transferred from registers of the previously-enabled OOO/EXE clusters 118 through the bypass 126 (i.e., as during normal execution when a source consumed by an instruction is located on a remote OOO/EXE cluster 118).

In some embodiments, an improved mechanism for cluster gating, which turns off voltage supply to disabled OOO/EXE clusters 118 rather than simply clock gating them, can be used. This configuration places OOO/EXE clusters 118 on independent voltage planes and is enabled by a power gate or by independent regulators. The registers containing state information for OOO/EXE clusters 118 reside on a separate voltage island to ensure these registers can be consumed or copied to enabled OOO/EXE clusters 118, as described above.

Frontend Backend Decoupling

In some embodiments, the adaptive microarchitecture mechanism implements frontend 122 and backend 120 decoupling and may be driven using the same telemetry system 106 and machine learning adaptation decision model 116 as that used for gating and ungating OOO/EXE clusters 118. In particular, decoupling the frontend 122 from the backend 120 improves efficiency by throttling the frontend 122 of the processor 104 when a machine learning adaptation decision model 116 detects that execution is backend bound. In one embodiment, the machine learning adaptation decision model 116 of the microcontroller 112 determines and forwards configuration parameters to the SoC 102 to decouple performance of the frontend 122 and backend 120. In these embodiments, the configuration parameters 114 include a clock frequency and operating voltage for the frontend 122 of the processor 104 that are set at levels below that of the backend 120 of the processor 104 or a clock frequency and operating voltage for the frontend 122 and the backend 120 of the processor 104 to be matched if no bottleneck is predicted. Reducing the operating voltage and frequency of the frontend 122 can result in significant energy savings in workloads that do not require high frontend 122 throughput.

Given that the frontend 122 of the processor 104 can be a smaller block of logic than the backend 120 of the processor 104 and has reduced current needs, voltage decoupling of the frontend 122 and the backend 120 can be efficiently achieved using a low-dropout regulator (LDO). The LDO controls voltage supply reduction for the frontend 122, while the rest of the processor 104, including the backend 120, continues to obtain voltage supply from a buck converter based Fully Integrated Voltage Regulator (FIVR). The LDO therefore allows for the independent throttling of the frontend 122 with respect to the backend 120.

Telemetry System Design

As mentioned above, the telemetry system 106 described herein provides telemetry metadata 108 with statistical significance over a wide range of conditions and captures a variety of architectural behaviors in the SoC 102. Capturing these behaviors is important for making the SoC 102 and corresponding processor 104 adaptive. In particular, statistical significance in the telemetry metadata 108 streams ensures that the machine learning adaptation decision model 116 is trained to be consistently accurate, while variety in the telemetry metadata 108 provided by the telemetry system 106 enables future adaptative models to be developed.

In one embodiment, the telemetry system 106 gathers telemetry metadata 108 from architectural event counters of the processor 104 (i.e., one or more of the data collectors 124 are architectural event counters), which may also be used for design debugging the SoC 102. Counters can be selected for generation of telemetry metadata 108 by evaluating their statistical properties over a large set of clients, servers, and/or outlier traces that represent a wide range of application behaviors. In particular, the outlier traces stress the extremes of microarchitecture/SoC 102 behavior and ensure telemetry metadata 108 is sufficiently representative for deployment in the field.

To determine which counters to include in the telemetry system 106, a statistical screen may be applied to a set of counters that maximizes (1) sensitivity and/or (2) variation across architecture states of the SoC 102. The first criterion screens away counters that report a single value for more than 1% of telemetry metadata 108 and the second criterion screens away counters in the bottom 50% by variance. These screens ensure that counters are sensitive enough to always provide meaningful information to the machine learning adaptation decision model 116, regardless of architecture state. Principal Component Analysis (PCA) may be applied to groups of counters that have similar information content. Choosing one counter from the top N PCA groups yields telemetry metadata 108 with the same information content, but different layouts.

Figure 3:
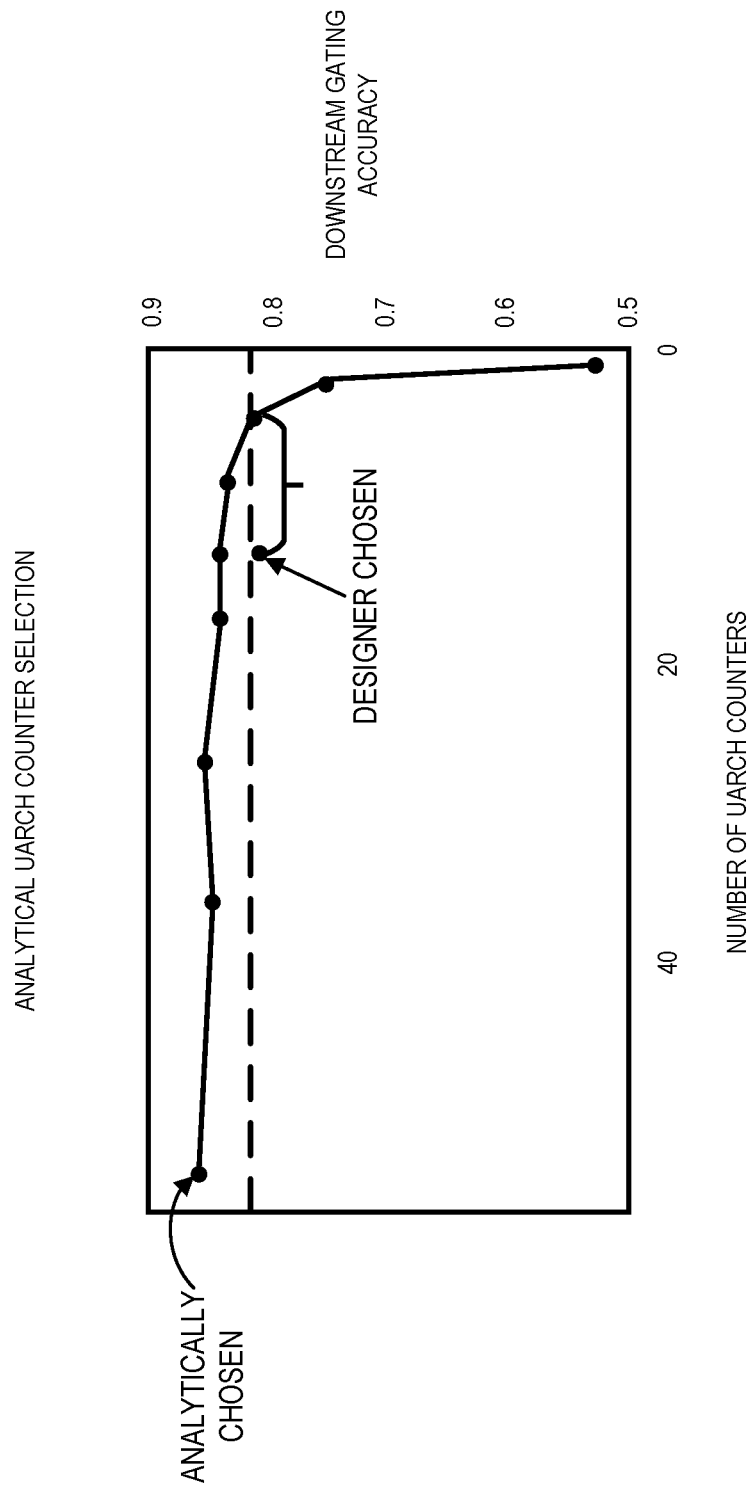
FIG. 3 demonstrates the impact of adding additional counters to a telemetry system using, according to one example embodiment.
Figure 4A:
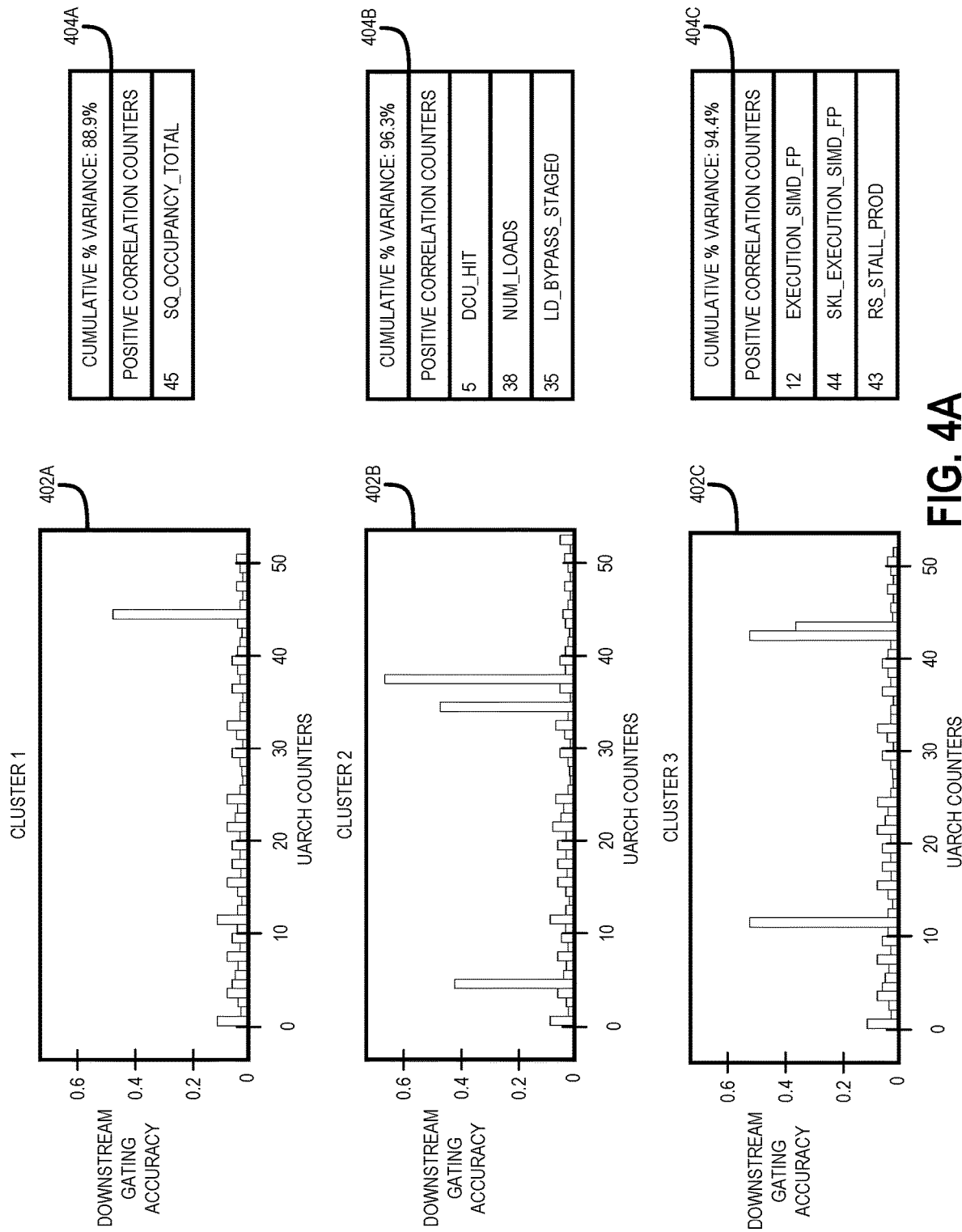
FIGS. 4A and 4B show how Principal Component Analysis (PCA) provides multiple routing options for the telemetry system, according to one example embodiment.
Figure 4B:
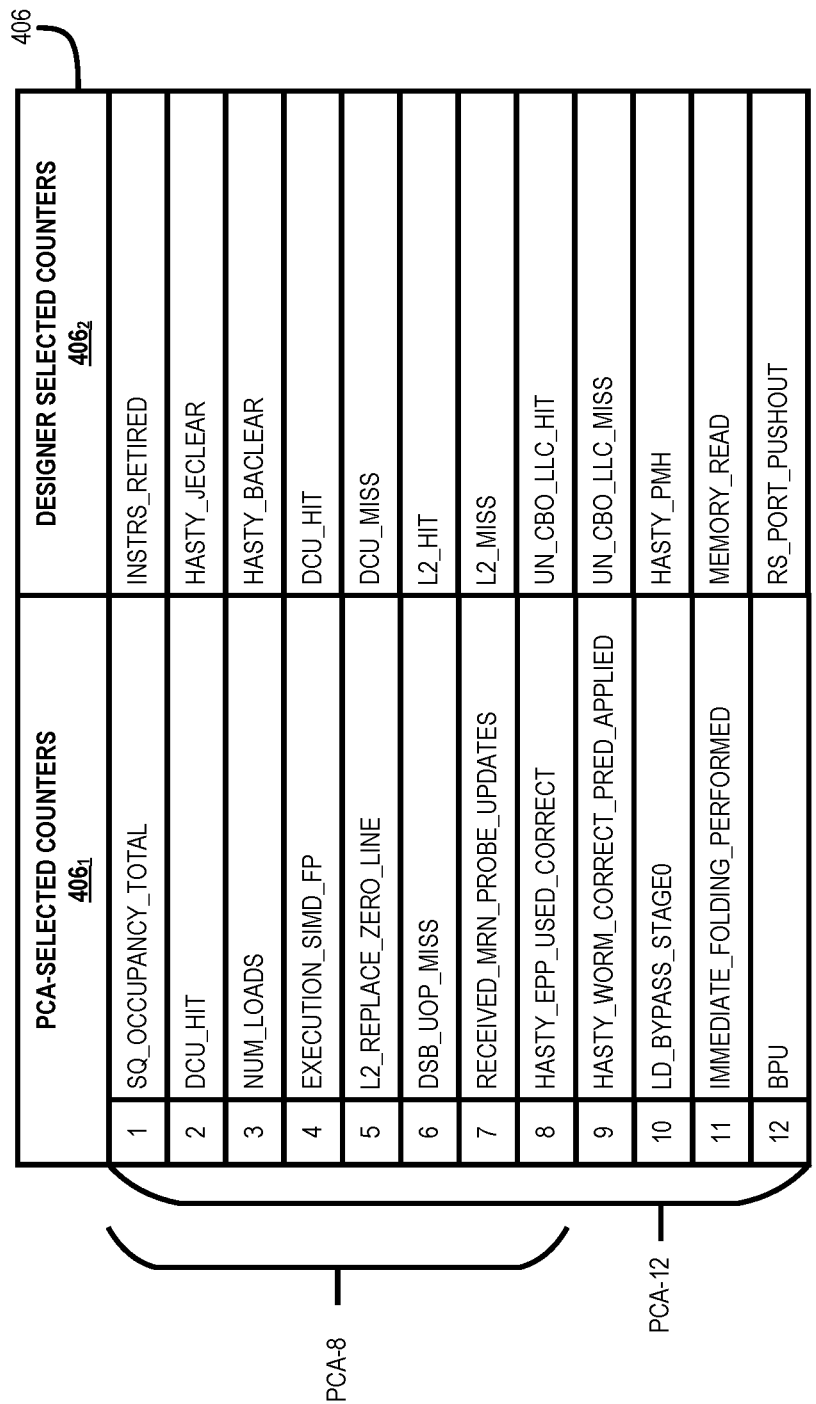

FIGS. 3, 4A, and 4B capture different aspects of the telemetry design methodology, according to one example embodiment. In particular, FIG. 3 shows a chart that demonstrates the impact of adding additional counters to the telemetry system 106 using the statistical criteria described herein. As shown, cluster gating accuracy degrades below acceptable limits when fewer than approximately eight counters are included, confirming the previously observed limitations of heuristics fit to a small number of telemetry metadata 108 streams. FIG. 3 also shows the difference in cluster gating accuracy when task-specific counters are chosen by experts. For the same number of counters, the machine learning adaptation decision model 116 driven system 100 provides a significant improvement in cluster gating accuracy on held-out workloads and more efficient use of available data.

FIGS. 4A and 4B show sets of charts and tables that demonstrate how PCA provides multiple routing options for the system 100. In particular, three OOO/EXE clusters 118 with a set of equivalent counters (from an information-content perspective) are shown in a first set of charts 402A-402C. Evaluation of a telemetry configuration for bottleneck prediction was performed based on the following several counters, including (1) LSD coverage, (2) ITLB misses, (3) pipeline flushes, (4) Icache misses, (5) DSB coverage, (6) incidence of taken branches, (7) incidence of complex instructions (handled by a single decoder), (8) incidence of MS flows, (9) MS coverage, and (10) bytes per instruction. Each counter in the charts 402A-402C is shown in relation to a downstream gating accuracy that indicates the corresponding counter's correlation with downstream gating accuracy. Counters for each OOO/EXE cluster 118 that meets a threshold value can be selected, as shown in tables 404A-404C. In FIG. 4B, a table 406 is presented in configurations for eight and twelve counters based on PCA are shown in a first column $406_1$. In this table 406 and for purposes of comparison, the set of counters that are derived from expert analysis are shown in a second column $406_2$. While there is some overlap between columns $406_1$ and $406_2$, there are counters with high information content that expert analysis did not select.

Microcontroller Design

In some embodiments, the microcontroller 112 described herein, including the machine learning adaptation decision model 116, is an off-the-shelf microcontroller. Accordingly, in some embodiments, the microcontroller 112 may only support x86 instructions and operate at 200 Million Instructions Per Second (MIPS). Using an off-the-shelf microcontroller 112 offers features key to real-world deployment (e.g., a single platform for running many adaptation models, the ability to update machine learning adaptation decision models post-silicon, and minimal design investment).

Microcontroller Firmware Design

Selecting a Machine Learning Model

In some embodiments, firmware for the microcontroller 112 is developed by first selecting a machine learning adaptation decision model 116 that satisfies the constraints of the target SoC 102 adaptation task. Unlike other designs, the described flexible platform supports different classes of statistical models without specialized hardware or design changes. This flexibility is exemplified in the OOO/EXE cluster 118 gating example by deploying a variety of machine learning adaptation decision models 116. FIG. 5 shows the respective accuracies of a number of different machine learning adaptation decision models 116, the number of model parameters (a proxy for memory footprint on the microcontroller 112), and the number of x86 micro-operations needed to generate a prediction (i.e., perform inference).

Computation and memory budgets are set based on microcontroller 112 specifications, the desired prediction frequency, and the number of simultaneous adaptation tasks that need to be supported. For example, a computation budget of 200 micro-operations per prediction and 4 KB memory footprint may be used. This budget supports up to three machine learning adaptation decision models 116 generating predictions every 20,000 application instructions, assuming an execution ratio of 32:1 between processor 104 and microcontroller 112.

Of the many models developed and evaluated, the small random forest, binary-precision deep neural network (DNN), and full precision DNN models were implemented in firmware. Of these, the first two met desired computation budgets and were used for subsequent performance studies described below.

Training and Optimizing Machine Learning Models for Firmware

In the OOO/EXE cluster gating 118 example described above, adaptation models 116 may be trained using open source software on a training set of telemetry metadata 108 aligned to parameter values. This data is collected by running the processor 104 in all possible configurations on clients, servers, and outlier traces. The configuration with lowest power (for a threshold of acceptable performance loss) is chosen as the optimal/best configuration.

After training, the models 116 are validated using a test set of held-out workloads. For the performant models 116 described above, firmware is generated by optimizing the custom code (e.g., C and assembly code) that implement their respective inference procedures. This code is thereafter installed on the microcontroller 112.

Performance

Figure 6:
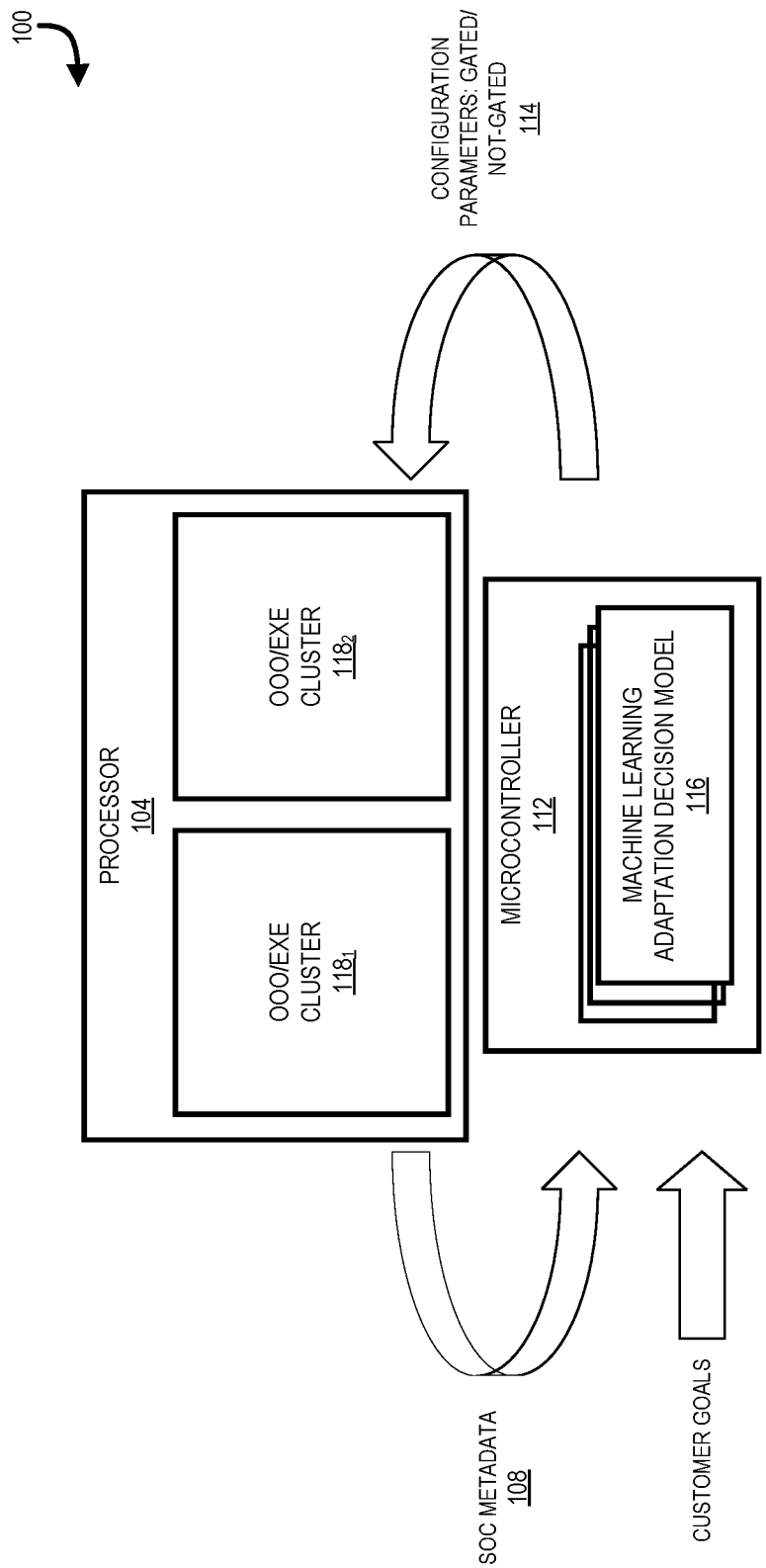
FIG. 6 shows a processor's adaptive cluster gating feature, according to one example embodiment.

FIG. 6 illustrates the processor's 104 adaptive OOO/EXE cluster 118 gating feature, in according with one embodiment. As shown, the processor 104 contains two OOO/EXE clusters 118 of computation resources than can be quickly enabled and disabled using a single set of architecture configuration parameters 114. A lightweight machine learning adaptation model 116 runs on the microcontroller 112 (e.g., a Tensilica® microcontroller) and predicts whether or not to gate the processor's 104 second OOO/EXE cluster $118_2$, using the latest telemetry metadata 108 provided by the telemetry system 106.

The above OOO/EXE cluster 118 gating system has been implemented in a cycle accurate CPU simulator, with telemetry metadata 108 recorded and architecture configuration adjusted every 10,000 instructions. Machine learning-driven adaptation is evaluated by training models on a large set of customer applications and validating accuracy on held-out applications not seen during training. Power and performance are estimated by recording simulated cycle counts, as well as power from an Architectural Level Power Simulator (ALPS) from each possible CPU configuration.

Figure 7:
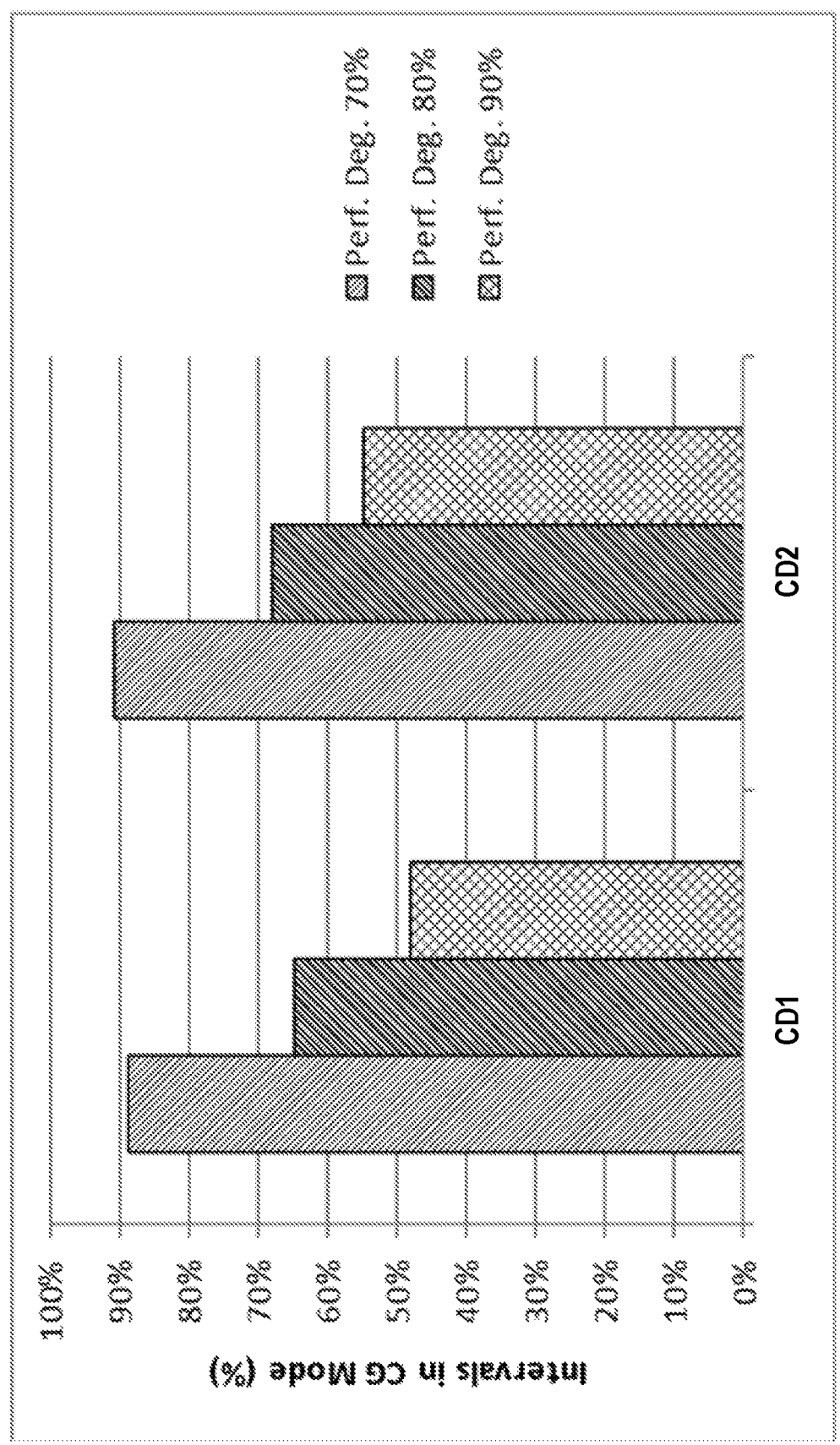
FIG. 7 shows the portion of runtime during which the processor is gated across 1,500 client traces, for service level agreements (SLAs) allowing performance to degrade to 90%, 80%, or 70%, according to one example embodiment.
Figure 8:
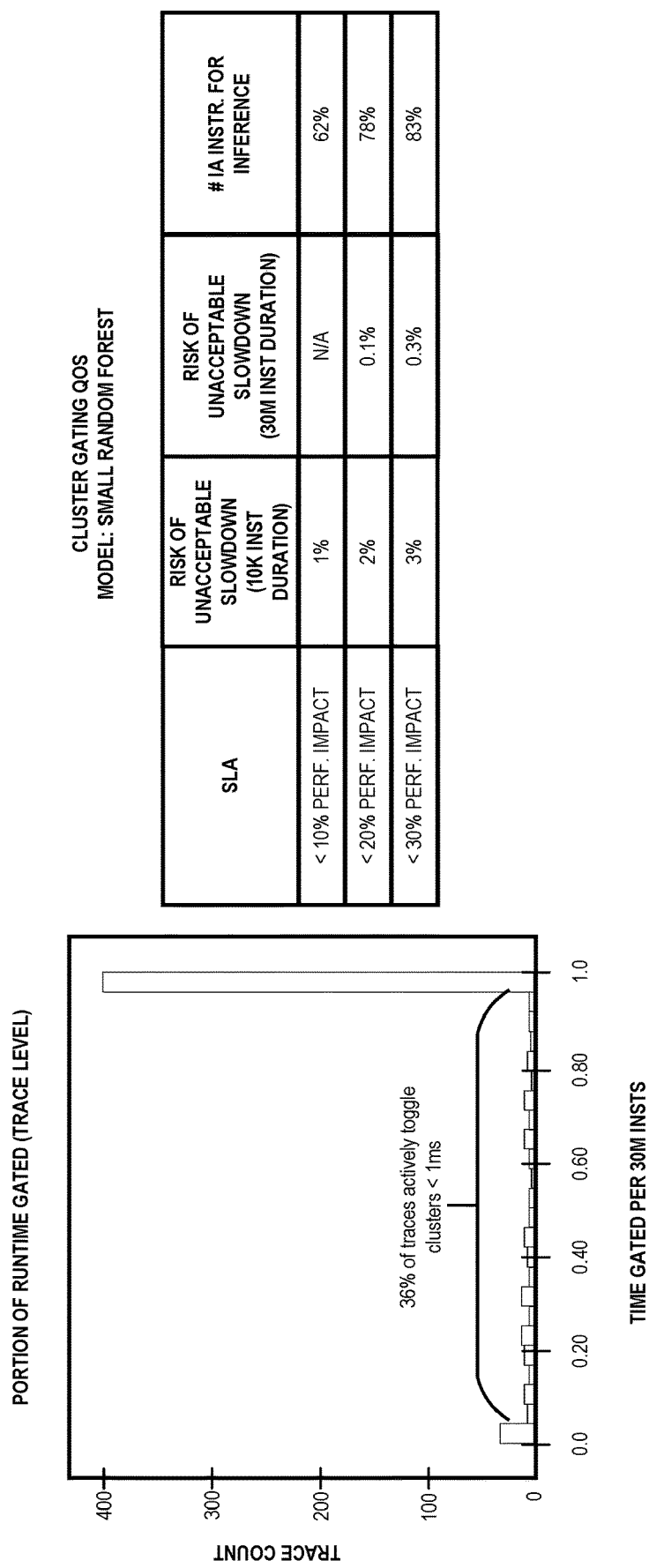
FIG. 8 shows the portion of traces requiring cluster configuration changes faster than 1 ms, alongside the accuracy of random forest firmware for each SLA, according to one example embodiment.

FIG. 7 shows the portion of runtime during which the processor 104 is gated across 1,500 client traces, for SLAs allowing performance to degrade to 90%, 80%, or 70%. Two candidate designs are compared, labeled CD1 and CD2, with CD2 providing more opportunity for gating. FIG. 8 shows the portion of traces requiring cluster configuration changes faster than 1 ms (left), alongside the accuracy of random forest firmware for each SLA (right). Power simulations indicate that the random forest predictor under the 70% performance-loss SLA improves performance per watt on-the-order of 20% over the processor's 104 baseline two-cluster 118 configuration. A comparable configuration showing the ability to predict phases of applications bottlenecking in the frontend 122 of the processor 104 has also been demonstrated.

These results indicate that the described system 100 enables the breakthrough timing and accuracy characteristics that machine learning brings to adaptive SoC 102 design, while executing on a flexible platform that supports scaling and post-silicon tuning. Further, the system 100 helps silicon achieve performance that was not previously possible, while providing key new capabilities that make adaptive SoC 102 deployment practical for the first time.

Figure 9:
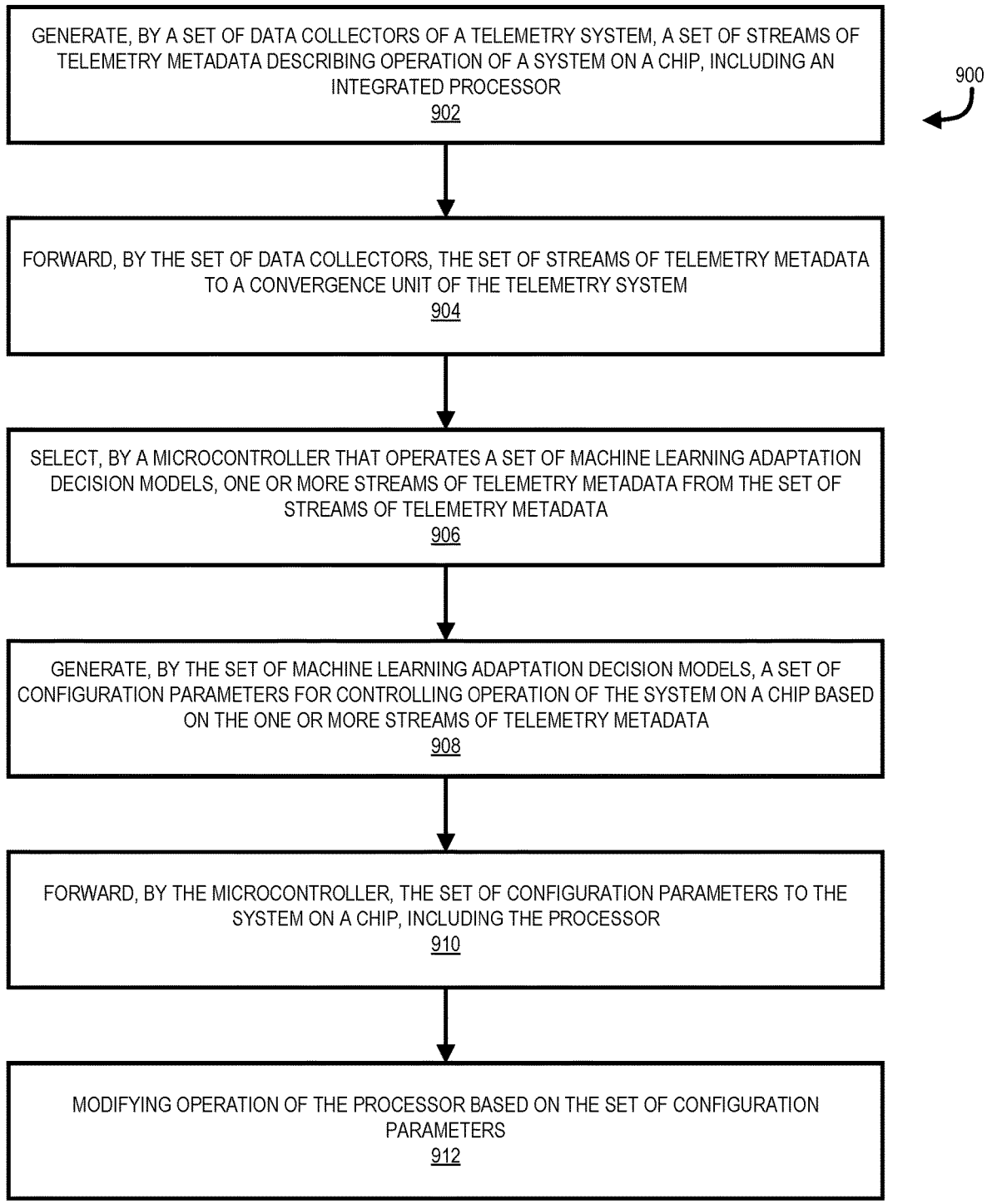
FIG. 9 shows a method for managing operation of a processor, according to one example embodiment.

Turning now to FIG. 9, a method 900 will be described for managing operation of the processor 104, according to one example embodiment. The method 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 900 is performed by one or more components of the system 100, including one or more of the SoC 102 (e.g., the processor 104) the telemetry system 106, and the microcontroller 112 (e.g., the set of machine learning adaptation decision models 116 and/or other components of firmware of the microcontroller 112). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 900 can commence at operation 902 with a set of data collectors 124 generating a set of streams of telemetry metadata 108. The telemetry metadata 108 describe operation of the SoC 102, including the processor 104.

At operation 904, the set of data collectors 124 forward the set of streams of telemetry metadata 108 to a convergence unit 110 of the telemetry system 106. The convergence unit 110 aggregates the telemetry metadata 108 at a single convergence point for access/use by the microcontroller 112.

At operation 906, the microcontroller 112 selects one or more streams of the telemetry metadata 108 provided by the convergence unit 110 for evaluation by the set of machine learning adaptation decision models 116 of the microcontroller 112. The set of streams of telemetry metadata 108 may be selected for improved accuracy by the set of machine learning adaptation decision models 116.

At operation 908, the set of machine learning adaptation decision models 116 generate a set of configuration parameters 114 for controlling operation of the SoC 102 based on the selected one or more streams of telemetry metadata 108. For example, the set of configuration parameters 114 can include settings for enabling and/or disabling one or more OOO/EXE clusters 118 in the processor 104. In particular, each OOO/EXE cluster 118 may operate on a separate voltage plane. In this embodiment, in response to determining that the processor is not frontend bound, the set of machine learning adaptation decision models 116 may generate a set of voltage settings as the set of configuration parameters 114 for one or more OOO/EXE clusters 118. These voltage settings reduce the operating voltage for the set of OOO/EXE clusters 118 and effectively disable these OOO/EXE clusters 118. Instructions are thereafter routed from the frontend 122 of the processor 104 to the remaining enabled OOO/EXE clusters 118. Further, state information from the disabled OOO/EXE clusters 118 in routed to the remaining enabled OOO/EXE clusters 118.

In another example, in response to determining that the processor is not frontend bound, the set of configuration parameters 114 can be used for decoupling the frontend 122 of the processor 104 from the backend 120 of the processor 104. In this example, the set of configuration parameters 114 include voltage and/or clock frequency settings for reducing the voltage and/or clock frequency of the frontend 122 in relation to the backend 120 of the processor 104 such that the frontend 122 is operating at a lower voltage and/or clock frequency than the backend 120 of the processor 104.

At operation 910, the set of configuration parameters 114 are forwarded to the SoC 102, including the processor 104. At operation 912, operation of the processor 104 is modified based on the set of configuration parameters 114. As noted above, this modification can include modification of the voltage of a set of OOO/EXE clusters 118 and/or one or more of the clock frequency and/or voltage of the frontend 122 of the processor 104.

As described above, the machine learning-driven adaptation system 100 improves power efficiency by adapting hardware to workload needs using predictive machine learning models 116. The machine learning-driven adaptation system 100 provides the potential for a 20% improvement in energy efficiency, measured in performance per watt. This provides reduced energy consumption and cost at a given performance point. Additionally, the machine learning-driven adaptation system 100 is an extensible platform for adaptation in future SoC 102 generations that requires minimal design investment. Furthermore, the flexibility to modify adaptation models 116 to specific customer workloads post-silicon provides a new opportunity for revenue through in-situ hardware Although the following embodiments are described with reference to specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations.

Figure 10:
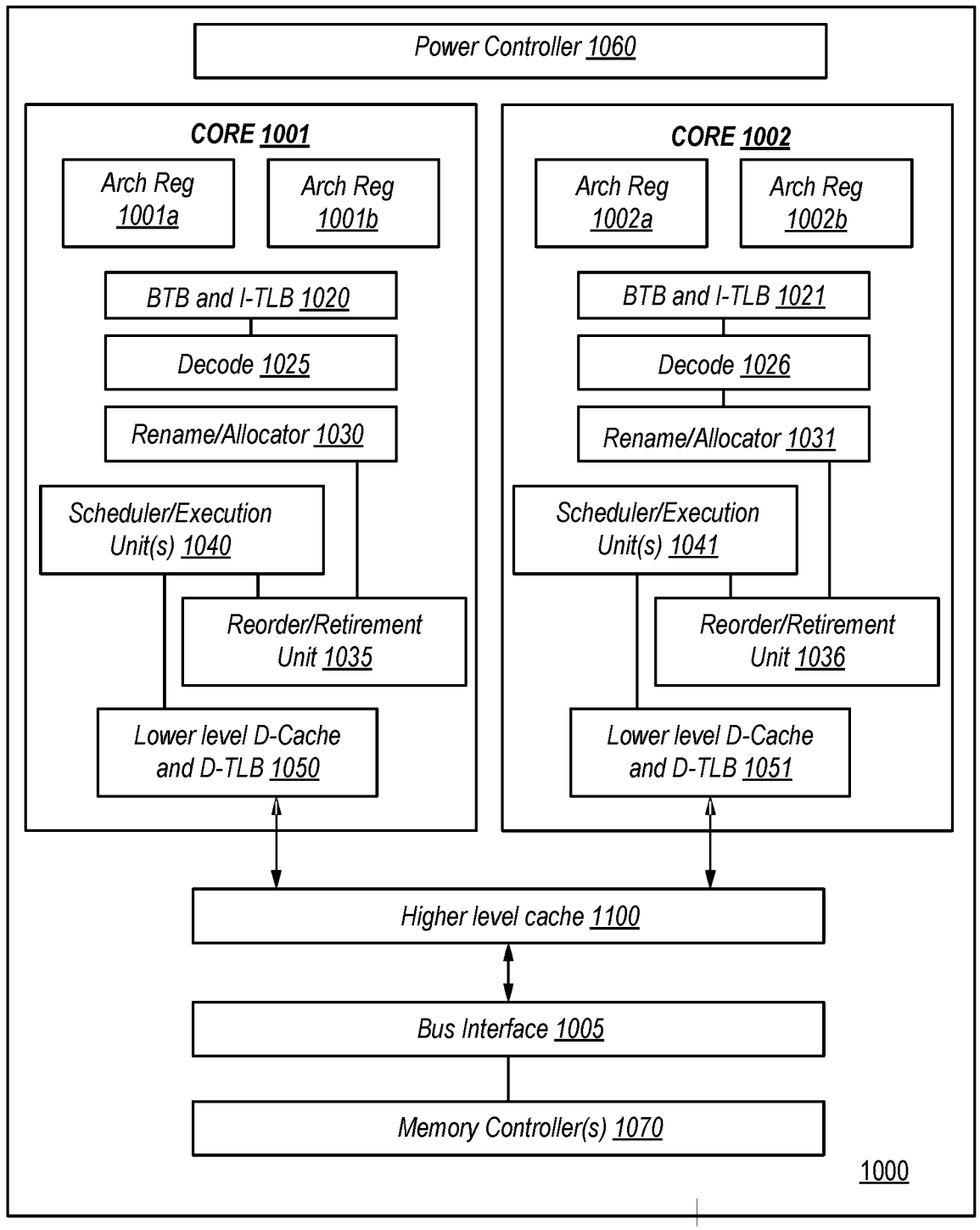
FIG. 10 is an embodiment of a processor including multiple cores, according to one example embodiment.

Referring to FIG. 10, an embodiment of a processor including multiple cores is illustrated. Processor 1000 includes any processor or processing device, such as a microprocessor, an embedded processor, a digital signal processor (DSP), a network processor, a handheld processor, an application processor, a co-processor, a system on a chip (SoC), or other device to execute code. Processor 1000, in one embodiment, includes at least two cores—cores 1001 and 1002, which may include asymmetric cores or symmetric cores (the illustrated embodiment). However, processor 1000 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1000, as illustrated in FIG. 10, includes two cores, cores 1001 and 1002. Here, cores 1001 and 1002 are considered symmetric cores, i.e., cores with the same configurations, functional units, and/or logic. In another embodiment, core 1001 includes an out-of-order processor core, while core 1002 includes an in-order processor core. However, cores 1001 and 1002 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1001 are described in further detail below, as the units in core 1002 operate in a similar manner.

As depicted, core 1001 includes two hardware threads 1001a and 1001b, which may also be referred to as hardware thread slots 1001a and 1001b. Therefore, software entities, such as an operating system, in one embodiment potentially view processor 1000 as four separate processors, i.e., four logical processors or processing elements capable of executing four software threads concurrently. As alluded to above, a first thread is associated with architecture state registers 1001a, a second thread is associated with architecture state registers 1001b, a third thread may be associated with architecture state registers 1002a, and a fourth thread may be associated with architecture state registers 1002b. Here, each of the architecture state registers (1001a, 1001b, 1002a, and 1002b) may be referred to as processing elements, thread slots, or thread units, as described above. As illustrated, architecture state registers 1001a are replicated in architecture state registers 1001b, so individual architecture states/contexts are capable of being stored for logical processor 1001a and logical processor 1001b. In core 1001, other smaller resources, such as instruction pointers and renaming logic in allocator and renamer block 1030 may also be replicated for threads 1001a and 1001b. Some resources, such as re-order buffers in reorder/retirement unit 1035, ILTB 1020, load/store buffers, and queues may be shared through partitioning. Other resources, such as general purpose internal registers, page-table base register(s), low-level data-cache and data-TLB 1015, execution unit(s) 1040, and portions of out-of-order unit 1035 are potentially fully shared.

Processor 1000 often includes other resources, which may be fully shared, shared through partitioning, or dedicated by/to processing elements. In FIG. 10, an embodiment of a purely exemplary processor with illustrative logical units/resources of a processor is illustrated. Note that a processor may include, or omit, any of these functional units, as well as include any other known functional units, logic, or firmware not depicted. As illustrated, core 1001 includes a simplified, representative out-of-order (OOO) processor core. But an in-order processor may be utilized in different embodiments. The OOO core includes a branch target buffer 1020 to predict branches to be executed/taken and an instruction-translation buffer (I-TLB) 1020 to store address translation entries for instructions.

Core 1001 further includes decode module 1025 coupled to fetch unit 1020 to decode fetched elements. Fetch logic, in one embodiment, includes individual sequencers associated with thread slots 1001a, 1001b, respectively. Usually core 1001 is associated with a first ISA, which defines/specifies instructions executable on processor 1000. Often machine code instructions that are part of the first ISA include a portion of the instruction (referred to as an opcode), which references/specifies an instruction or operation to be performed. Decode logic 1025 includes circuitry that recognizes these instructions from their opcodes and passes the decoded instructions on in the pipeline for processing as defined by the first ISA. For example, decoders 1025, in one embodiment, include logic designed or adapted to recognize specific instructions, such as transactional instruction. As a result of the recognition by decoders 1025, the architecture or core 1001 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1030 includes an allocator to reserve resources, such as register files to store instruction processing results. However, threads 1001a and 1001b are potentially capable of out-of-order execution, where allocator and renamer block 1030 also reserves other resources, such as reorder buffers to track instruction results. Unit 1030 may also include a register renamer to rename program/instruction reference registers to other registers internal to processor 1000. Reorder/retirement unit 1035 includes components, such as the reorder buffers mentioned above, load buffers, and store buffers, to support out-of-order execution and later in-order retirement of instructions executed out-of-order.

Scheduler and execution unit(s) block 1040, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1050 are coupled to execution unit(s) 1040. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1001 and 1002 share access to higher-level or further-out cache 1010, which is to cache recently fetched elements. Note that higher-level or further-out refers to cache levels increasing or getting further away from the execution unit(s). In one embodiment, higher-level cache 1010 is a last-level data cache—last cache in the memory hierarchy on processor 1000—such as a second or third level data cache. However, higher level cache 1010 is not so limited, as it may be associated with or includes an instruction cache. A trace cache—a type of instruction cache—instead may be coupled after decoder 1025 to store recently decoded traces.

In the depicted configuration, processor 1000 also includes bus interface module 1005 and a power controller 1060, which may perform power management in accordance with an embodiment of the present invention. In this scenario, bus interface 1005 is to communicate with devices external to processor 1000, such as system memory and other components.

A memory controller 1070 may interface with other devices such as one or many memories. In an example, bus interface 1005 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 11:
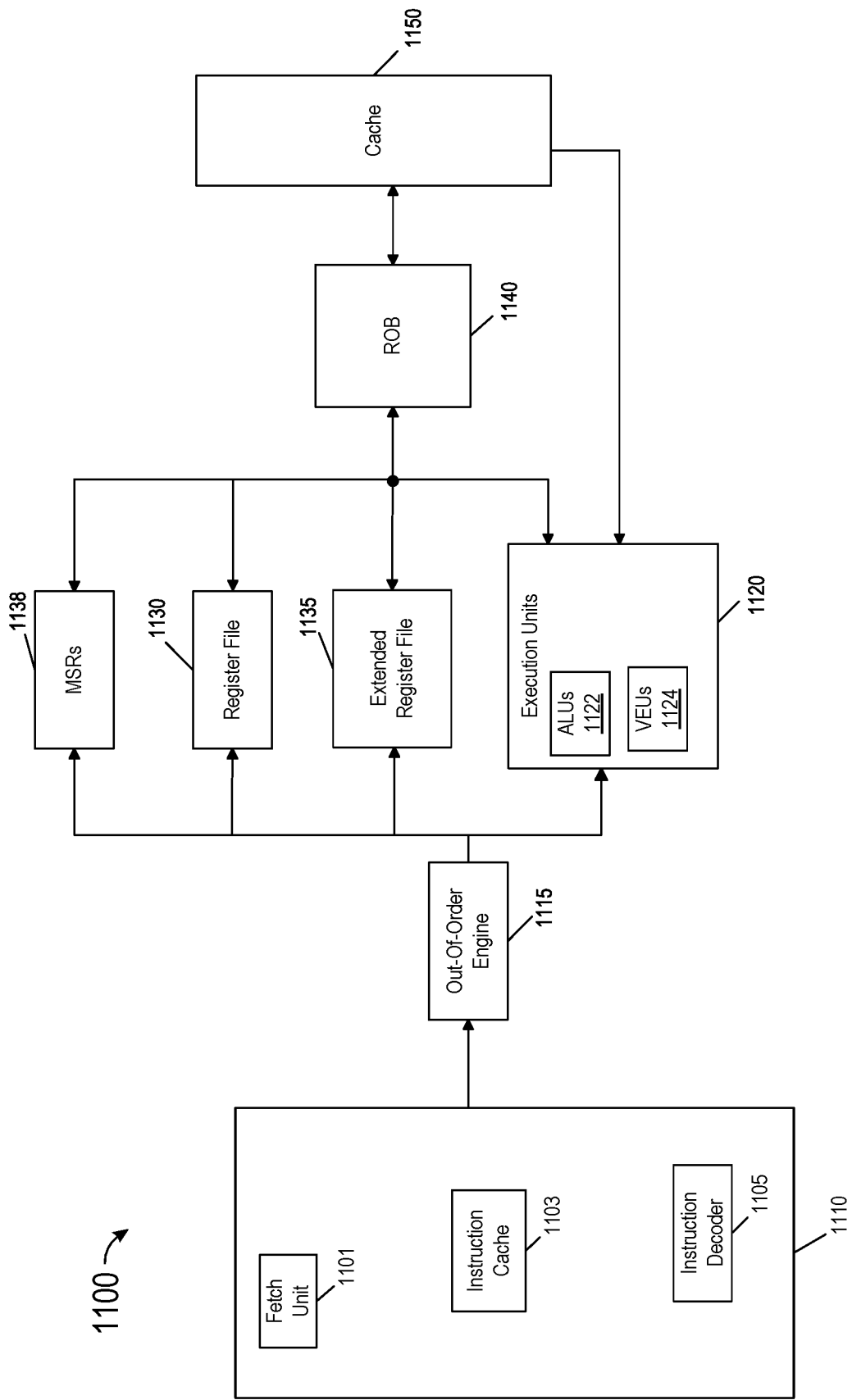
FIG. 11 is a block diagram of a micro-architecture of a processor core, according to one example embodiment.

Referring now to FIG. 11, shown is a block diagram of a micro-architecture of a processor core in accordance with one embodiment of the present invention. As shown in FIG. 11, processor core 1100 may be a multi-stage pipelined out-of-order processor. Core 1100 may operate at various voltages based on a received operating voltage, which may be received from an integrated voltage regulator or external voltage regulator.

As seen in FIG. 11, core 1100 includes front end units 1110, which may be used to fetch instructions to be executed and prepare them for use later in the processor pipeline. For example, front end units 1110 may include a fetch unit 1101, an instruction cache 1103, and an instruction decoder 1105. In some implementations, front end units 1110 may further include a trace cache, along with microcode storage as well as a micro-operation storage. Fetch unit 1101 may fetch macro-instructions, e.g., from memory or instruction cache 1103, and feed them to instruction decoder 1105 to decode them into primitives, i.e., micro-operations for execution by the processor.

Coupled between front end units 1110 and execution units 1120 is an out-of-order (OOO) engine 1115 that may be used to receive the micro-instructions and prepare them for execution. More specifically OOO engine 1115 may include various buffers to re-order micro-instruction flow and allocate various resources needed for execution, as well as to provide renaming of logical registers onto storage locations within various register files such as register file 1130 and extended register file 1135. Register file 1130 may include separate register files for integer and floating point operations. For purposes of configuration, control, and additional operations, a set of machine specific registers (MSRs) 1138 may also be present and accessible to various logic within core 1100 (and external to the core).

Various resources may be present in execution units 1120, including, for example, various integer, floating point, and single instruction multiple data (SIMD) logic units, among other specialized hardware. For example, such execution units may include one or more arithmetic logic units (ALUs) 1122 and one or more vector execution units 1124, among other such execution units.

Results from the execution units may be provided to retirement logic, namely a reorder buffer (ROB) 1140. More specifically, ROB 1140 may include various arrays and logic to receive information associated with instructions that are executed. This information is then examined by ROB 1140 to determine whether the instructions can be validly retired and result data committed to the architectural state of the processor, or whether one or more exceptions occurred that prevent a proper retirement of the instructions. Of course, ROB 1140 may handle other operations associated with retirement.

As shown in FIG. 11, ROB 1140 is coupled to a cache 1150 which, in one embodiment may be a low level cache (e.g., an L1 cache although the scope of the present invention is not limited in this regard. Also, execution units 1120 can be directly coupled to cache 1150. From cache 1150, data communication may occur with higher level caches, system memory and so forth. Note that performance and energy efficiency capabilities of core 1100 may vary based on workload and/or processor constraints. As such, a power controller (not shown in FIG. 11) may dynamically determine an appropriate configuration for all or a portion of processor 1100 based at least in part on thermal set point, determined as described herein. While shown with this high level in the embodiment of FIG. 11, understand the scope of the present invention is not limited in this regard. For example, while the implementation of FIG. 11 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 12:
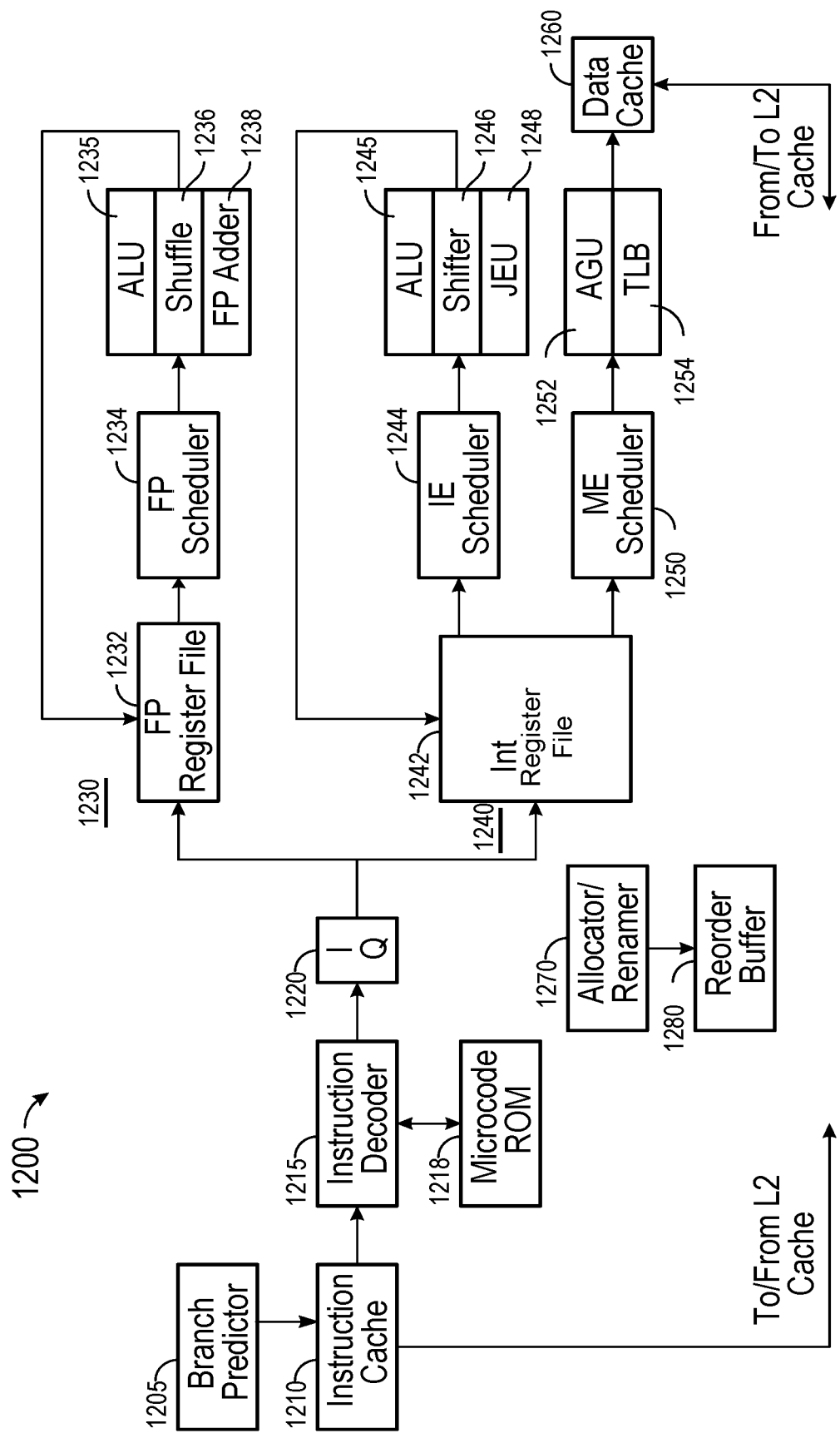
FIG. 12 is a block diagram of a micro-architecture of a processor core, according to one example embodiment.

Referring now to FIG. 12, shown is a block diagram of a micro-architecture of a processor core in accordance with another embodiment. In the embodiment of FIG. 12, core 1200 may be a low power core of a different micro-architecture, such as an Intel® Atom™-based processor having a relatively limited pipeline depth designed to reduce power consumption. As seen, core 1200 includes an instruction cache 1210 coupled to provide instructions to an instruction decoder 1215. A branch predictor 1205 may be coupled to instruction cache 1210. Note that instruction cache 1210 may further be coupled to another level of a cache memory, such as an L2 cache (not shown for ease of illustration in FIG. 12). In turn, instruction decoder 1215 provides decoded instructions to an issue queue 1220 for storage and delivery to a given execution pipeline. A microcode ROM 1218 is coupled to instruction decoder 1215.

A floating point pipeline 1230 includes a floating point register file 1232 which may include a plurality of architectural registers of a given bit with such as 128, 256 or 512 bits. Pipeline 1230 includes a floating point scheduler 1234 to schedule instructions for execution on one of multiple execution units of the pipeline. In the embodiment shown, such execution units include an ALU 1235, a shuffle unit 1236, and a floating point adder 1238. In turn, results generated in these execution units may be provided back to buffers and/or registers of register file 1232. Of course understand while shown with these few example execution units, additional or different floating point execution units may be present in another embodiment.

An integer pipeline 1240 also may be provided. In the embodiment shown, pipeline 1240 includes an integer register file 1242 which may include a plurality of architectural registers of a given bit with such as 128 or 256 bits. Pipeline 1240 includes an integer scheduler 1244 to schedule instructions for execution on one of multiple execution units of the pipeline. In the embodiment shown, such execution units include an ALU 1245, a shifter unit 1246, and a jump execution unit 1248. In turn, results generated in these execution units may be provided back to buffers and/or registers of register file 1242. Of course understand while shown with these few example execution units, additional or different integer execution units may be present in another embodiment.

A memory execution scheduler 1250 may schedule memory operations for execution in an address generation unit 1252, which is also coupled to a TLB 1254. As seen, these structures may couple to a data cache 1260, which may be a L0 and/or L1 data cache that in turn couples to additional levels of a cache memory hierarchy, including an L2 cache memory.

To provide support for out-of-order execution, an allocator/renamer 1270 may be provided, in addition to a reorder buffer 1280, which is configured to reorder instructions executed out of order for retirement in order. Note that performance and energy efficiency capabilities of core 1200 may vary based on workload and/or processor constraints. As such, a power controller (not shown in FIG. 12) may dynamically determine an appropriate configuration for all or a portion of processor 500 based at least in part on thermal set point, determined as described herein. Although shown with this particular pipeline architecture in the illustration of FIG. 12, understand that many variations and alternatives are possible.

Note that in a processor having asymmetric cores, such as in accordance with the micro-architectures of FIGS. 11 and 12, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 13:
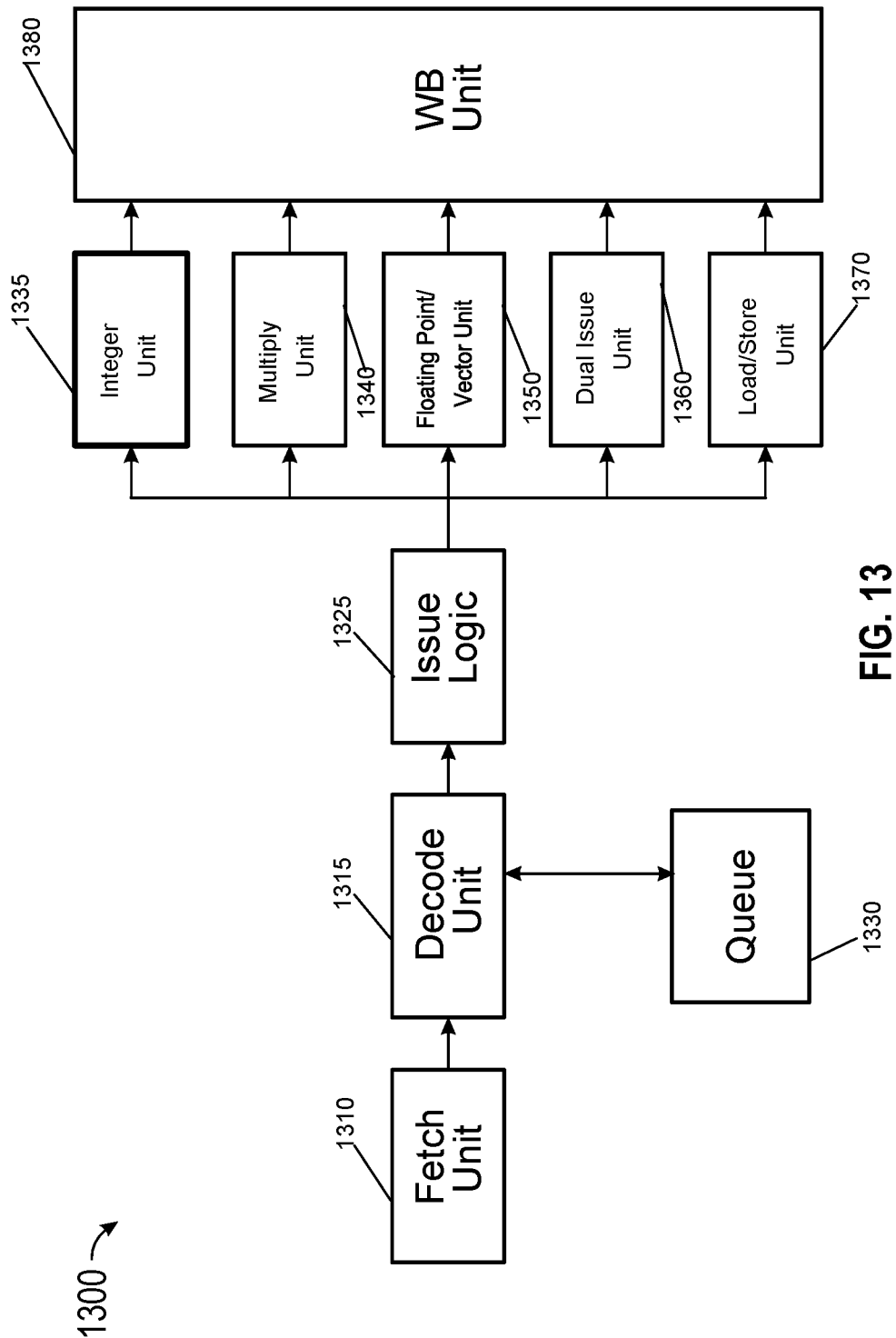
FIG. 13 is a block diagram of a micro-architecture of a processor core, according to one example embodiment.

Referring to FIG. 13, shown is a block diagram of a micro-architecture of a processor core in accordance with yet another embodiment. As illustrated in FIG. 13, a core 1300 may include a multi-staged in-order pipeline to execute at very low power consumption levels. As one such example, processor 1300 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 1300 includes a fetch unit 1310 that is configured to fetch instruction and provide them to a decode unit 1315, which may decode the instructions, e.g., macro-instructions of a given ISA such as an ARMv8 ISA. Note further that a queue 1330 may couple to decode unit 1315 to store decoded instructions. Decoded instructions are provided to an issue logic 1325, where the decoded instructions may be issued to a given one of multiple execution units.

With further reference to FIG. 13, issue logic 1325 may issue instructions to one of multiple execution units. In the embodiment shown, these execution units include an integer unit 1335, a multiply unit 1340, a floating point/vector unit 1350, a dual issue unit 1360, and a load/store unit 1370. The results of these different execution units may be provided to a writeback unit 1380. Understand that while a single writeback unit is shown for ease of illustration, in some implementations separate writeback units may be associated with each of the execution units. Furthermore, understand that while each of the units and logic shown in FIG. 13 is represented at a high level, a particular implementation may include more or different structures. A processor designed using one or more cores having a pipeline as in FIG. 13 may be implemented in many different end products, extending from mobile devices to server systems.

Figure 14:
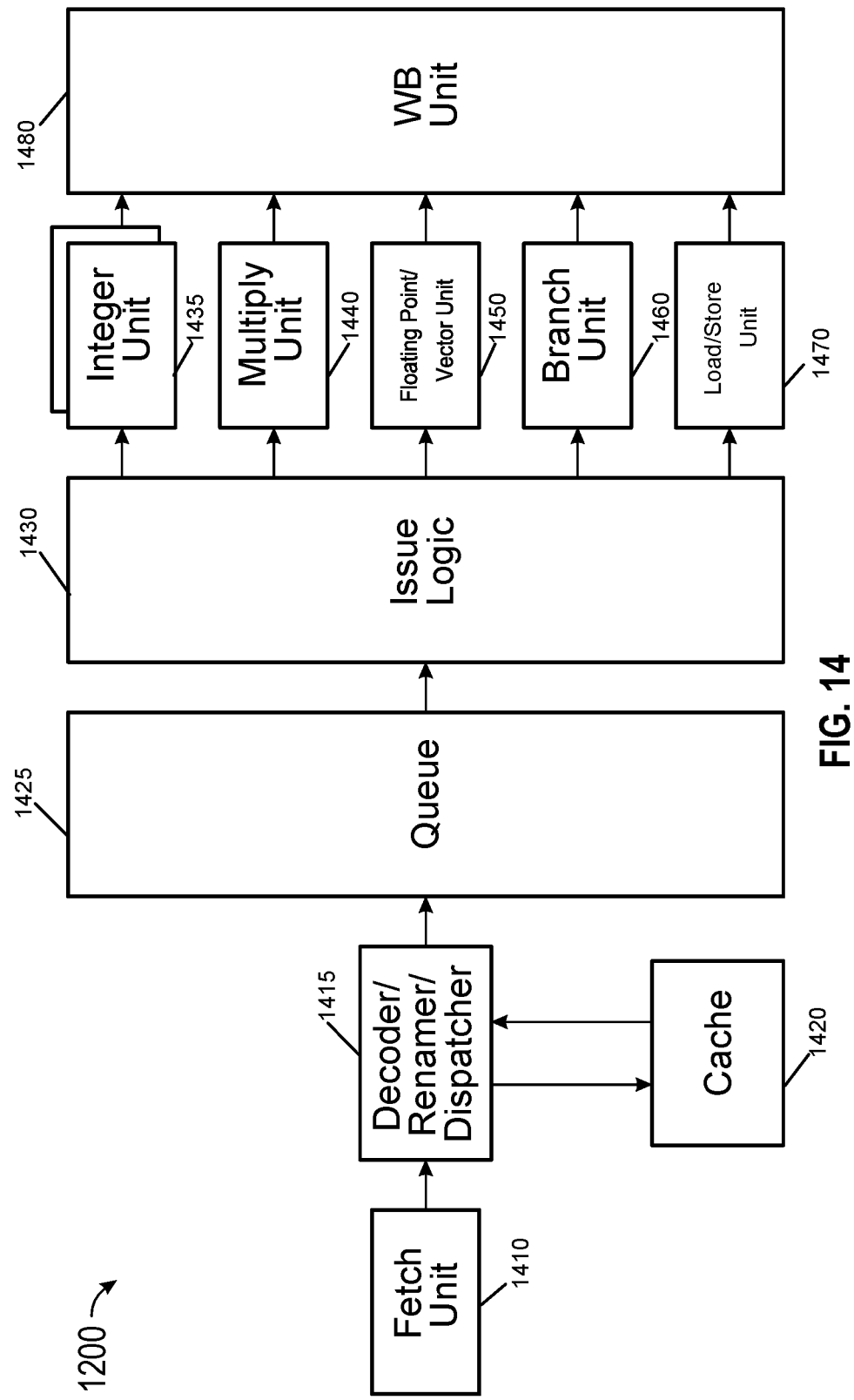
FIG. 14 is a block diagram of a micro-architecture of a processor core, according to one example embodiment.

Referring to FIG. 14, shown is a block diagram of a micro-architecture of a processor core in accordance with a still further embodiment. As illustrated in FIG. 14, a core 1400 may include a multi-stage multi-issue out-of-order pipeline to execute at very high performance levels (which may occur at higher power consumption levels than core 1300 of FIG. 13). As one such example, processor 1400 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 1400 includes a fetch unit 1410 that is configured to fetch instructions and provide them to a decoder/renamer/dispatcher 1415, which may decode the instructions, e.g., macro-instructions of an ARMv8 instruction set architecture, rename register references within the instructions, and dispatch the instructions (eventually) to a selected execution unit. Decoded instructions may be stored in a queue 1425. Note that while a single queue structure is shown for ease of illustration in FIG. 14, understand that separate queues may be provided for each of the multiple different types of execution units.

Also shown in FIG. 14 is an issue logic 1430 from which decoded instructions stored in queue 1425 may be issued to a selected execution unit. Issue logic 1430 also may be implemented in a particular embodiment with a separate issue logic for each of the multiple different types of execution units to which issue logic 1430 couples.

Decoded instructions may be issued to a given one of multiple execution units. In the embodiment shown, these execution units include one or more integer units 1435, a multiply unit 1440, a floating point/vector unit 1450, a branch unit 1460, and a load/store unit 1470. In an embodiment, floating point/vector unit 1450 may be configured to handle SIMD or vector data of 128 or 256 bits. Still further, floating point/vector execution unit 1450 may perform IEEE-754 double precision floating-point operations. The results of these different execution units may be provided to a writeback unit 1480. Note that in some implementations separate writeback units may be associated with each of the execution units. Furthermore, understand that while each of the units and logic shown in FIG. 14 is represented at a high level, a particular implementation may include more or different structures.

Note that in a processor having asymmetric cores, such as in accordance with the micro-architectures of FIGS. 13 and 14, workloads may be dynamically swapped for power management reasons, as these cores, although having different pipeline designs and depths, may be of the same or related ISA. Such dynamic core swapping may be performed in a manner transparent to a user application (and possibly kernel also).

Figure 15:
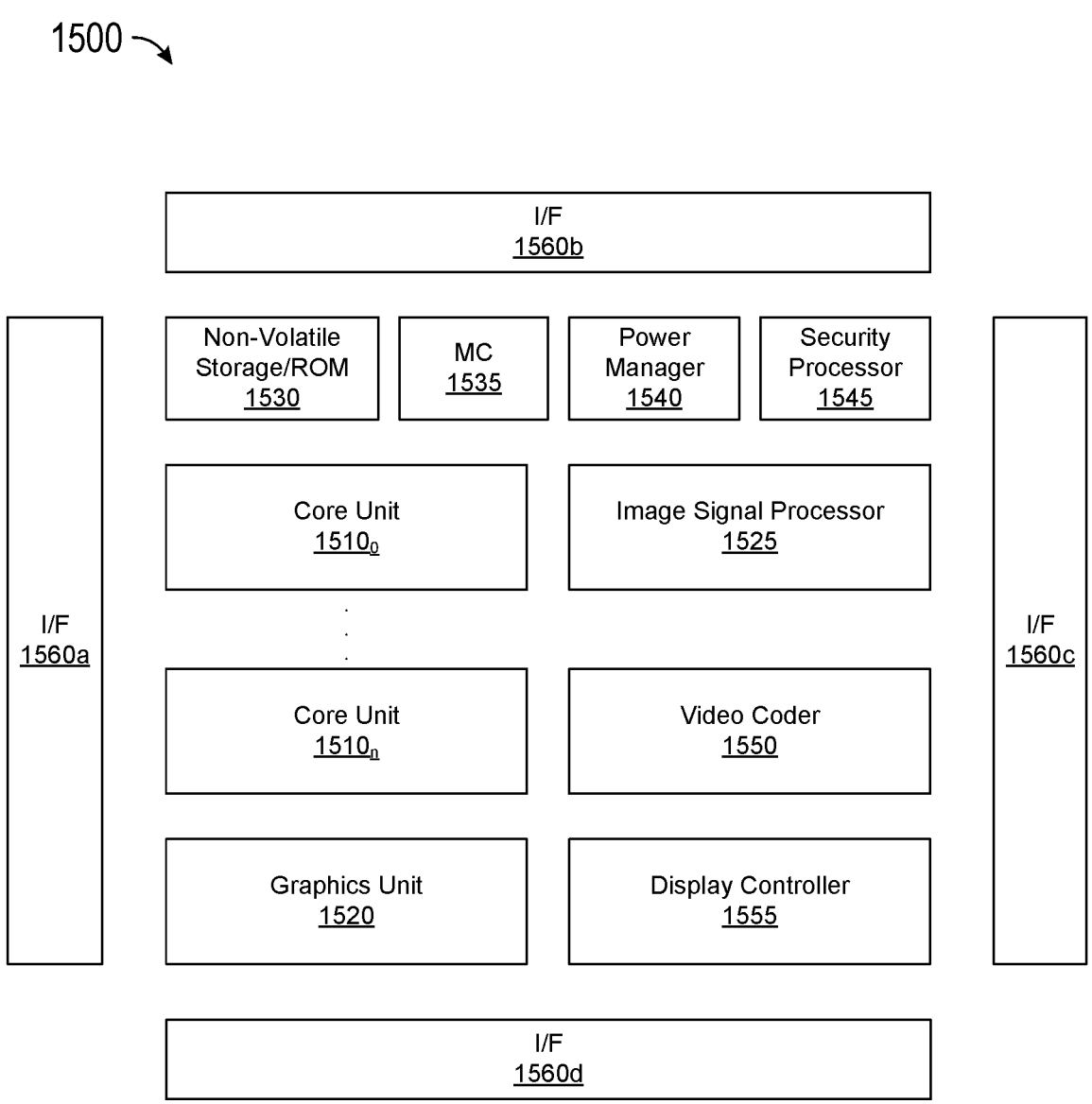
FIG. 15 is a block diagram of a processor, according to another example embodiment.

A processor designed using one or more cores having pipelines as in any one or more of 10-13 may be implemented in many different end products, extending from mobile devices to server systems. Referring now to FIG. 15, shown is a block diagram of a processor in accordance with another embodiment of the present invention. In the embodiment of FIG. 15, processor 1500 may be a SoC including multiple domains, each of which may be controlled to operate at an independent operating voltage and operating frequency. As a specific illustrative example, processor 1500 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device, or a vehicle computing system.

In the high level view shown in FIG. 15, processor 1500 includes a plurality of core units $1510_0$-$1510_n$. Each core unit may include one or more processor cores, one or more cache memories and other circuitry. Each core unit 1510 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 1530 may be used to store various program and other data. For example, this storage may be used to store at least portions of microcode, boot information such as a BIOS, other system software and other information. In embodiments, non-volatile storage 1530 may store multiple configurations as described herein, which may be prioritized for use by firmware.

Each core unit 1510 may also include an interface such as a bus interface unit to enable interconnection to additional circuitry of the processor. In an embodiment, each core unit 1510 couples to a coherent fabric that may act as a primary cache coherent on-die interconnect that in turn couples to a memory controller 1535. In turn, memory controller 1535 controls communications with a memory such as a DRAM (not shown for ease of illustration in FIG. 15).

In addition to core units, additional processing engines are present within the processor, including at least one graphics unit 1520 which may include one or more graphics processing units (GPUs) to perform graphics processing as well as to possibly execute general purpose operations on the graphics processor (so-called GPGPU operation). In addition, at least one image signal processor 1525 may be present. Signal processor 1525 may be configured to process incoming image data received from one or more capture devices, either internal to the SoC or off-chip.

Other accelerators also may be present. In the illustration of FIG. 15, a video coder 1550 may perform coding operations including encoding and decoding for video information, e.g., providing hardware acceleration support for high definition video content. A display controller 1555 further may be provided to accelerate display operations including providing support for internal and external displays of a system. In addition, a security processor 1545 may be present to perform security operations such as secure boot operations, various cryptography operations and so forth.

Each of the units may have its power consumption controlled via a power manager 1540, which may include control logic to perform the various power management techniques described herein, including dynamic determination of an appropriate configuration based on thermal point selection.

In some embodiments, SoC 1500 may further include a non-coherent fabric coupled to the coherent fabric to which various peripheral devices may couple. One or more interfaces 1560a-1560d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 15, understand the scope of the present invention is not limited in this regard.

Figure 16:
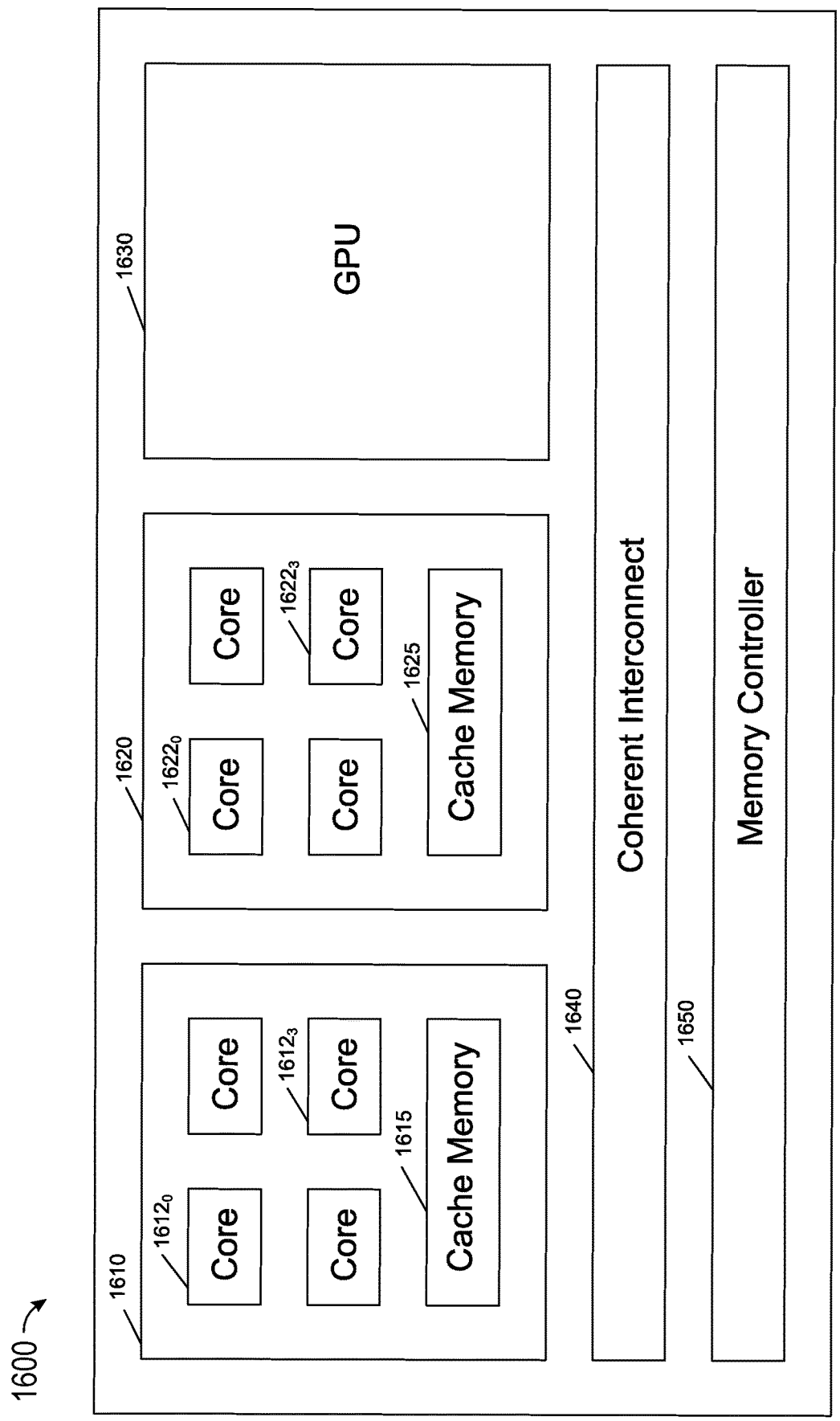
FIG. 16 is a block diagram of a representative SoC, according to one example embodiment.

Referring now to FIG. 16, shown is a block diagram of a representative SoC. In the embodiment shown, SoC 1600 may be a multi-core SoC configured for low power operation to be optimized for incorporation into a smartphone or other low power device such as a tablet computer or other portable computing device or vehicle computing system. As an example, SoC 1600 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 16, SoC 1600 includes a first core domain 1610 having a plurality of first cores $1612_0$-$1612_3$. In an example, these cores may be low power cores such as in-order cores as described herein. In one embodiment these first cores may be implemented as ARM Cortex A53 cores. In turn, these cores couple to a cache memory 1615 of core domain 1610. In addition, SoC 1600 includes a second core domain 1620. In the illustration of FIG. 16, second core domain 1620 has a plurality of second cores $1622_0$-$1622_3$. In an example, these cores may be higher power-consuming cores than first cores 1612. In an embodiment, the second cores may be out-of-order cores, which may be implemented as ARM Cortex A57 cores. In turn, these cores couple to a cache memory 1625 of core domain 1620. Note that while the example shown in FIG. 16 includes 4 cores in each domain, understand that more or fewer cores may be present in a given domain in other examples.

With further reference to FIG. 16, a graphics domain 1630 also is provided, which may include one or more graphics processing units (GPUs) configured to independently execute graphics workloads, e.g., provided by one or more cores of core domains 1610 and 1620. As an example, GPU domain 1630 may be used to provide display support for a variety of screen sizes, in addition to providing graphics and display rendering operations.

As seen, the various domains couple to a coherent interconnect 1640, which in an embodiment may be a cache coherent interconnect fabric that in turn couples to an integrated memory controller 1650. Coherent interconnect 1640 may include a shared cache memory, such as an L3 cache, in some examples. In an embodiment, memory controller 1650 may be a direct memory controller to provide for multiple channels of communication with an off-chip memory, such as multiple channels of a DRAM (not shown for ease of illustration in FIG. 16).

In different examples, the number of the core domains may vary. For example, for a low power SoC suitable for incorporation into a mobile computing device, a limited number of core domains such as shown in FIG. 16 may be present. Still further, in such low power SoCs, core domain 1620 including higher power cores may have fewer numbers of such cores. For example, in one implementation two cores 1622 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 17:
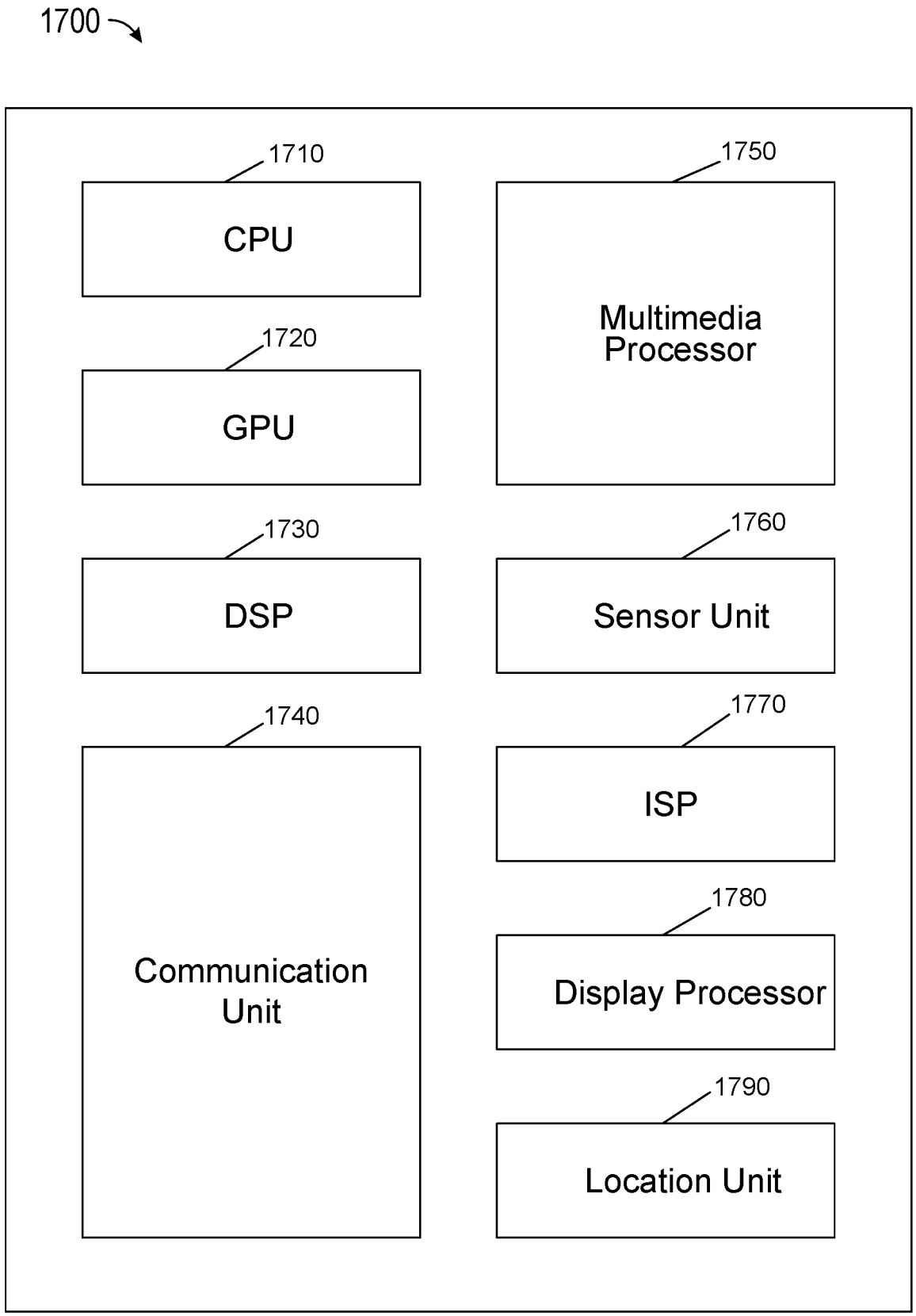
FIG. 17 is a block diagram of another example SoC, according to one example embodiment.

Referring now to FIG. 17, shown is a block diagram of another example SoC. In the embodiment of FIG. 17, SoC 1700 may include various circuitry to enable high performance for multimedia applications, communications and other functions. As such, SoC 1700 is suitable for incorporation into a wide variety of portable and other devices, such as smartphones, tablet computers, smart TVs, vehicle computing systems, and so forth. In the example shown, SoC 1700 includes a central processor unit (CPU) domain 1710. In an embodiment, a plurality of individual processor cores may be present in CPU domain 1710. As one example, CPU domain 1710 may be a quad core processor having 4 multithreaded cores. Such processors may be homogeneous or heterogeneous processors, e.g., a mix of low power and high power processor cores.

In turn, a GPU domain 1720 is provided to perform advanced graphics processing in one or more GPUs to handle graphics and compute APIs. A DSP unit 1730 may provide one or more low power DSPs for handling low-power multimedia applications such as music playback, audio/video and so forth, in addition to advanced calculations that may occur during execution of multimedia instructions. In turn, a communication unit 1740 may include various components to provide connectivity via various wireless protocols, such as cellular communications (including 3G/4G LTE), wireless local area protocols such as Bluetooth™, IEEE 802.11, and so forth.

Still further, a multimedia processor 1750 may be used to perform capture and playback of high definition video and audio content, including processing of user gestures. A sensor unit 1760 may include a plurality of sensors and/or a sensor controller to interface to various off-chip sensors present in a given platform. An image signal processor 1770 may be provided with one or more separate ISPs to perform image processing with regard to captured content from one or more cameras of a platform, including still and video cameras.

A display processor 1780 may provide support for connection to a high definition display of a given pixel density, including the ability to wirelessly communicate content for playback on such display. Still further, a location unit 1790 may include a GPS receiver with support for multiple GPS constellations to provide applications highly accurate positioning information obtained using as such GPS receiver. Understand that while shown with this particular set of components in the example of FIG. 17, many variations and alternatives are possible.

Figure 18:
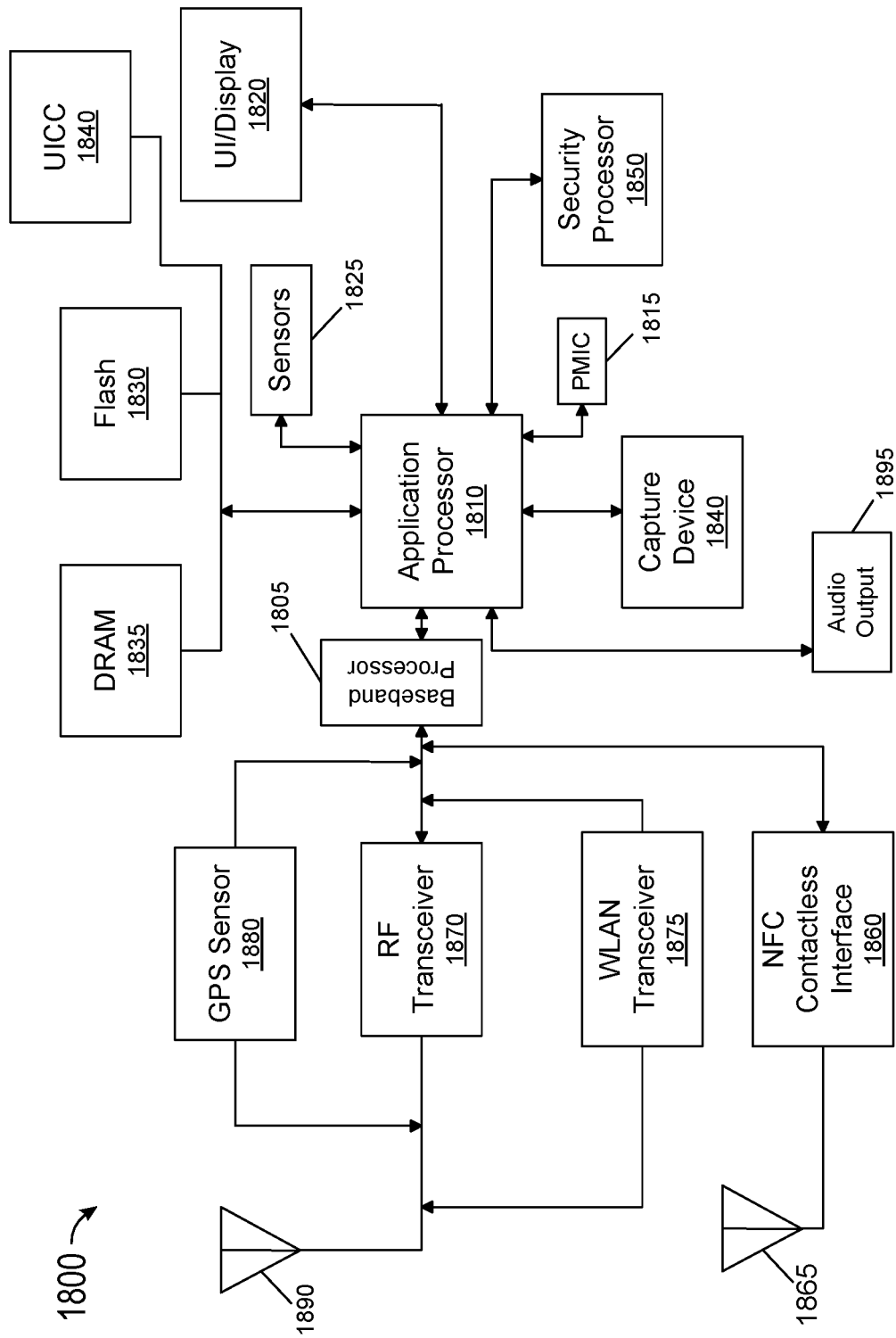
FIG. 18 is a block diagram of an example system with which embodiments can be used.

Referring now to FIG. 18, shown is a block diagram of an example system with which embodiments can be used. As seen, system 1800 may be a smartphone or other wireless communicator. A baseband processor 1805 is configured to perform various signal processing with regard to communication signals to be transmitted from or received by the system. In turn, baseband processor 1805 is coupled to an application processor 1810, which may be a main CPU of the system to execute an OS and other system software, in addition to user applications such as many well-known social media and multimedia apps. Application processor 1810 may include a power controller and may further be configured to perform a variety of other computing operations for the device.

In turn, application processor 1810 can couple to a user interface/display 1820, e.g., a touch screen display. In addition, application processor 1810 may couple to a memory system including a non-volatile memory, namely a flash memory 1830 and a system memory, namely a dynamic random access memory (DRAM) 1835. As further seen, application processor 1810 further couples to a capture device 1840 such as one or more image capture devices that can record video and/or still images.

Still referring to FIG. 18, a universal integrated circuit card (UICC) 1840 comprising a subscriber identity module and possibly a secure storage and cryptoprocessor is also coupled to application processor 1810. System 1800 may further include a security processor 1850 that may couple to application processor 1810. A plurality of sensors 1825 may couple to application processor 1810 to enable input of a variety of sensed information such as accelerometer and other environmental information. An audio output device 1895 may provide an interface to output sound, e.g., in the form of voice communications, played or streaming audio data and so forth.

As further illustrated, a near field communication (NFC) contactless interface 1860 is provided that communicates in a NFC near field via an NFC antenna 1865. While separate antennae are shown in FIG. 18, understand that in some implementations one antenna or a different set of antennae may be provided to enable various wireless functionality.

A power management integrated circuit (PMIC) 1815 couples to application processor 1810 to perform platform level power management. To this end, PMIC 1815 may issue power management requests to application processor 1810 to enter certain low power states as desired. Furthermore, based on platform constraints, PMIC 1815 may also control the power level of other components of system 1800.

To enable communications to be transmitted and received, various circuitry may be coupled between baseband processor 1805 and an antenna 1890. Specifically, a radio frequency (RF) transceiver 1870 and a wireless local area network (WLAN) transceiver 1875 may be present. In general, RF transceiver 1870 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1880 may be present. Other wireless communications such as receipt or transmission of radio signals, e.g., AM/FM and other signals may also be provided. In addition, via WLAN transceiver 1875, local wireless communications can also be realized.

Figure 19:
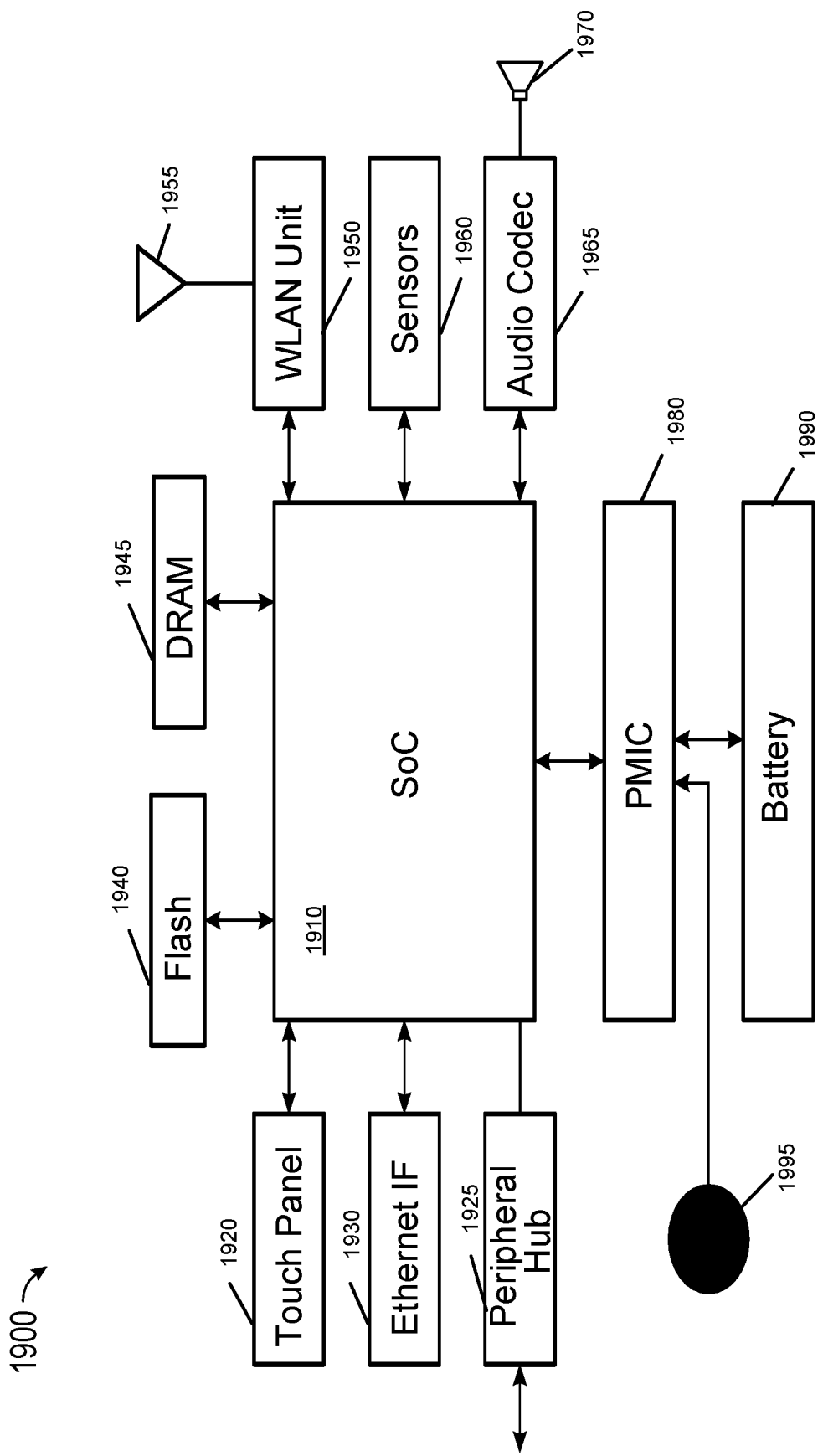
FIG. 19 is a block diagram of another example system with which embodiments may be used.

Referring now to FIG. 19, shown is a block diagram of another example system with which embodiments may be used. In the illustration of FIG. 19, system 1900 may be mobile low-power system such as a tablet computer, 2:1 tablet, phablet or other convertible or standalone tablet system. As illustrated, a SoC 1910 is present and may be configured to operate as an application processor for the device and which may include a power controller.

A variety of devices may couple to SoC 1910. In the illustration shown, a memory subsystem includes a flash memory 1940 and a DRAM 1945 coupled to SoC 1910. In addition, a touch panel 1920 is coupled to the SoC 1910 to provide display capability and user input via touch, including provision of a virtual keyboard on a display of touch panel 1920. To provide wired network connectivity, SoC 1910 couples to an Ethernet interface 1930. A peripheral hub 1925 is coupled to SoC 1910 to enable interfacing with various peripheral devices, such as may be coupled to system 1900 by any of various ports or other connectors.

In addition to internal power management circuitry and functionality within SoC 1910, a PMIC 1980 is coupled to SoC 1910 to provide platform-based power management, e.g., based on whether the system is powered by a battery 1990 or AC power via an AC adapter 1995. In addition to this power source-based power management, PMIC 1980 may further perform platform power management activities based on environmental and usage conditions. Still further, PMIC 1980 may communicate control and status information to SoC 1910 to cause various power management actions within SoC 1910.

Still referring to FIG. 19, to provide for wireless capabilities, a WLAN unit 1950 is coupled to SoC 1910 and in turn to an antenna 1955. In various implementations, WLAN unit 1950 may provide for communication according to one or more wireless protocols.

As further illustrated, a plurality of sensors 1960 may couple to SoC 1910. These sensors may include various accelerometer, environmental and other sensors, including user gesture sensors. Finally, an audio codec 1965 is coupled to SoC 1910 to provide an interface to an audio output device 1970. Of course, understand that while shown with this particular implementation in FIG. 19, many variations and alternatives are possible.

Figure 20:
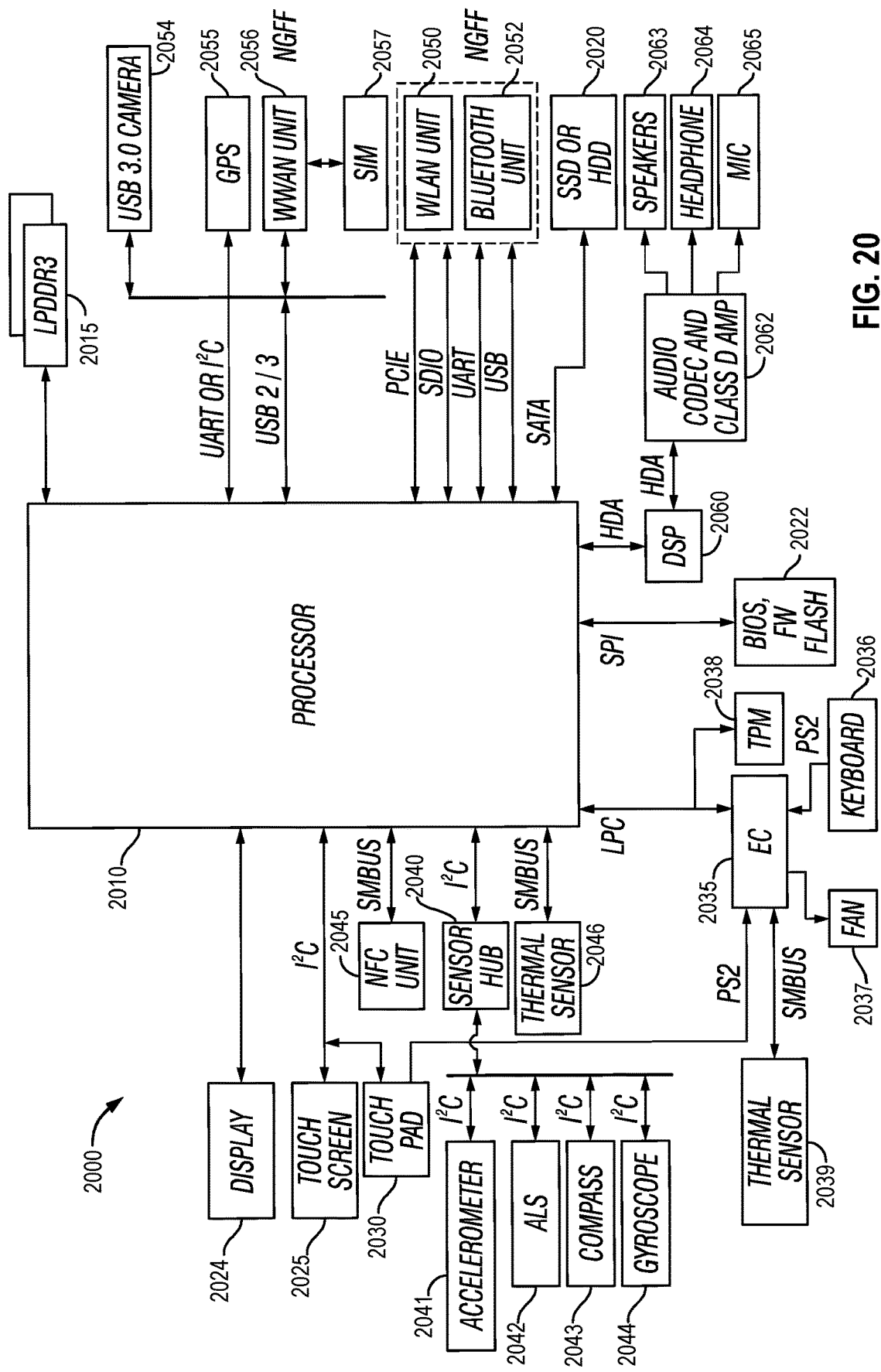
FIG. 20 is a block diagram of a representative computer system, according to one example embodiment.

Referring now to FIG. 20, shown is a block diagram of a representative computer system such as notebook, Ultrabook™ or other small form factor system. A processor 2010, in one embodiment, includes a microprocessor, multi-core processor, multithreaded processor, an ultra low voltage processor, an embedded processor, or other known processing element. In the illustrated implementation, processor 2010 acts as a main processing unit and central hub for communication with many of the various components of the system 2000. As one example, processor 2000 is implemented as a SoC and which may include a power controller.

Processor 2010, in one embodiment, communicates with a system memory 2015. As an illustrative example, the system memory 2015 is implemented via multiple memory devices or modules to provide for a given amount of system memory.

To provide for persistent storage of information such as data, applications, one or more operating systems and so forth, a mass storage 2020 may also couple to processor 2010. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 20, a flash device 2022 may be coupled to processor 2010, e.g., via a serial peripheral interface (SPI). This flash device may provide for non-volatile storage of system software, including a basic input/output software (BIOS) as well as other firmware of the system.

Various input/output (I/O) devices may be present within system 2000. Specifically shown in the embodiment of FIG. 20 is a display 2024 which may be a high definition LCD or LED panel that further provides for a touch screen 2025. In one embodiment, display 2024 may be coupled to processor 2010 via a display interconnect that can be implemented as a high performance graphics interconnect. Touch screen 2025 may be coupled to processor 2010 via another interconnect, which in an embodiment can be an I$^2$C interconnect. As further shown in FIG. 20, in addition to touch screen 2025, user input by way of touch can also occur via a touch pad 2030 which may be configured within the chassis and may also be coupled to the same I$^2$C interconnect as touch screen 2025.

For perceptual computing and other purposes, various sensors may be present within the system and may be coupled to processor 2010 in different manners. Certain inertial and environmental sensors may couple to processor 2010 through a sensor hub 2040, e.g., via an I$^2$C interconnect. In the embodiment shown in FIG. 20, these sensors may include an accelerometer 2041, an ambient light sensor (ALS) 2042, a compass 2043 and a gyroscope 2044. Other environmental sensors may include one or more thermal sensors 2046 which in some embodiments couple to processor 2010 via a system management bus (SMBus) bus.

Also seen in FIG. 20, various peripheral devices may couple to processor 2010 via a low pin count (LPC) interconnect. In the embodiment shown, various components can be coupled through an embedded controller 2035. Such components can include a keyboard 2036 (e.g., coupled via a PS2 interface), a fan 2037, and a thermal sensor 2039. In some embodiments, touch pad 2030 may also couple to EC 2035 via a PS2 interface. In addition, a security processor such as a trusted platform module (TPM) 2038 may also couple to processor 2010 via this LPC interconnect.

System 2000 can communicate with external devices in a variety of manners, including wirelessly. In the embodiment shown in FIG. 20, various wireless modules, each of which can correspond to a radio configured for a particular wireless communication protocol, are present. One manner for wireless communication in a short range such as a near field may be via a NFC unit 2045 which may communicate, in one embodiment with processor 2010 via an SMBus. Note that via this NFC unit 2045, devices in close proximity to each other can communicate.

As further seen in FIG. 20, additional wireless units can include other short range wireless engines including a WLAN unit 2050 and a Bluetooth unit 2052. Using WLAN unit 2050, Wi-Fi™ communications can be realized, while via Bluetooth unit 2052, short range Bluetooth™ communications can occur. These units may communicate with processor 2010 via a given link.

In addition, wireless wide area communications, e.g., according to a cellular or other wireless wide area protocol, can occur via a WWAN unit 2056 which in turn may couple to a subscriber identity module (SIM) 2057. In addition, to enable receipt and use of location information, a GPS module 2055 may also be present. Note that in the embodiment shown in FIG. 20, WWAN unit 2056 and an integrated capture device such as a camera module 2054 may communicate via a given link.

An integrated camera module 2054 can be incorporated in the lid. To provide for audio inputs and outputs, an audio processor can be implemented via a digital signal processor (DSP) 2060, which may couple to processor 2010 via a high definition audio (HDA) link. Similarly, DSP 2060 may communicate with an integrated coder/decoder (CODEC) and amplifier 2062 that in turn may couple to output speakers 2063 which may be implemented within the chassis. Similarly, amplifier and CODEC 2062 can be coupled to receive audio inputs from a microphone 2065 which in an embodiment can be implemented via dual array microphones (such as a digital microphone array) to provide for high quality audio inputs to enable voice-activated control of various operations within the system. Note also that audio outputs can be provided from amplifier/CODEC 2062 to a headphone jack 2064. Although shown with these particular components in the embodiment of FIG. 20, understand the scope of the present invention is not limited in this regard.

Further Examples

Example 1 provides an exemplary system on a chip comprising: a processor; and a set of memory components that store instructions, which when executed by the processor cause the system on a chip to: generate, by a set of data collectors of a telemetry subsystem, a set of streams of telemetry metadata describing operation of the processor, forward one or more streams of telemetry metadata from the set of streams of telemetry metadata to a set of machine learning-driven adaptation decision models, receive, from the set of machine learning-driven adaptation decision models, a set of configuration parameters for controlling operation of the processor based on the one or more streams of telemetry metadata, and modify operation of the processor based on the set of configuration parameters.

Example 2 includes the substance of the exemplary system on a chip of Example 1, wherein modifying operation of the processor includes one or more of enabling or disabling one or more processing elements in a set of processing elements of the processor.

Example 3 includes the substance of the exemplary system on a chip of Example 2, wherein the set of machine learning-driven adaptation decision models is to determine whether execution in the processor is frontend bound or not frontend bound, wherein, in response to determining that execution in the processor is not frontend bound, the set of machine learning-driven adaptation decision models is to generate the set of configuration parameters to cause the processor to disable the one or more processing elements of the processor.

Example 4 includes the substance of the exemplary system on a chip of Example 3, wherein, in response to disabling the one or more processing elements, instructions to be processed by the processor are steered from the frontend of the processor to remaining enabled processing elements of the processor.

Example 5 includes the substance of the exemplary system on a chip of Example 4, wherein disabling the set of processing elements of the processor includes routing state information of the one or more processing elements to the remaining enabled processing elements of the processor.

Example 6 includes the substance of the exemplary system on a chip of Example 3, wherein the processing elements are one or more of out of order units and execution units.

Example 7 includes the substance of the exemplary system on a chip of Example 3, wherein each processing element in the set of processing elements operates on a separate voltage plane and disabling the one or more processing elements includes turning off voltage from corresponding voltage planes for the one or more processing elements.

Example 8 includes the substance of the exemplary system on a chip of Example 3, wherein, in response to determining that execution in the processor is not frontend bound, the set of machine learning-driven adaptation decision models is to generate the set of configuration parameters to cause the processor to reduce one or more of voltage and clock frequency of the frontend of the processor independent of the backend of the processor such that the frontend of the processor operates at one or more of a lower voltage and clock frequency in comparison to the backend of the processor.

Example 9 provides an exemplary system for managing operation of a processor, the system comprising: a system on a chip, including a processor; a telemetry subsystem, including a set of data collectors to generate a set of streams of telemetry metadata describing operation of the processor; and a set of machine learning-driven adaptation decision models to generate a set of configuration parameters for controlling operation of the processor based on the one or more streams of telemetry metadata received from the telemetry subsystem, wherein operation of the processor is to be modified based on the set of configuration parameters received from the set of machine learning-driven adaptation decision models.

Example 10 includes the substance of the exemplary system of Example 9, wherein modifying operation of the processor includes one or more of enabling or disabling one or more processing elements in a set of processing elements of the processor.

Example 11 includes the substance of the exemplary system of Example 10, wherein the set of machine learning-driven adaptation decision models is to determine whether execution in the processor is frontend bound or not frontend bound, wherein, in response to determining that execution in the processor is not frontend bound, the set of machine learning-driven adaptation decision models is to generate the set of configuration parameters to cause the processor to disable the one or more processing elements of the processor.

Example 12 includes the substance of the exemplary system of Example 11, wherein, in response to disabling the one or more processing elements, instructions to be processed by the processor are steered from the frontend of the processor to remaining enabled processing elements of the processor.

Example 13 includes the substance of the exemplary system of Example 12, wherein disabling the set of processing elements of the processor includes routing state information of the one or more processing elements to the remaining enabled processing elements of the processor.

Example 14 includes the substance of the exemplary system of Example 11, wherein the processing elements are one or more of out of order units and execution units.

Example 15 includes the substance of the exemplary system of Example 11, wherein each processing element in the set of processing elements operates on a separate voltage plane and disabling the one or more processing elements includes turning off voltage from corresponding voltage planes for the one or more processing elements.

Example 16 includes the substance of the exemplary system of Example 11, wherein, in response to determining that execution in the processor is not frontend bound, the set of machine learning-driven adaptation decision models is to generate the set of configuration parameters to cause the processor to reduce one or more of voltage and clock frequency of the frontend of the processor independent of the backend of the processor such that the frontend of the processor operates at one or more of a lower voltage and clock frequency in comparison to the backend of the processor.

Example 17 provides an exemplary non-transitory machine-readable storage medium that includes instructions, which when executed by a processor, cause the processor to: generate, by a set of data collectors of a telemetry subsystem, a set of streams of telemetry metadata describing operation of the processor; forward, by the telemetry subsystem, one or more streams of telemetry metadata from the set of streams of telemetry metadata to a set of machine learning-driven adaptation decision models; generate, by the set of machine learning-driven adaptation decision models, a set of configuration parameters for controlling operation of the processor based on the one or more streams of telemetry metadata; forward, by the machine learning-driven adaptation decision models, the set of configuration parameters to the processor; and modify operation of the processor based on the set of configuration parameters.

Example 18 includes the substance of the exemplary non-transitory machine-readable storage medium of Example 17, wherein modifying operation of the processor includes one or more of enabling or disabling one or more processing elements in a set of processing elements of the processor, wherein the set of machine learning-driven adaptation decision models is to determine whether execution in the processor is frontend bound or not frontend bound, and wherein, in response to determining that execution in the processor is not frontend bound, the set of machine learning-driven adaptation decision models is to generate the set of configuration parameters to cause the processor to disable the one or more processing elements of the processor.

Example 19 includes the substance of the exemplary non-transitory machine-readable storage medium of Example 18, wherein, in response to disabling the one or more processing elements, instructions to be processed by the processor are steered from the frontend of the processor to remaining enabled processing elements of the processor, wherein disabling the set of processing elements of the processor includes routing state information of the one or more processing elements to the remaining enabled processing elements of the processor, and wherein each processing element in the set of processing elements operates on a separate voltage plane and disabling the one or more processing elements includes turning off voltage from corresponding voltage planes for the one or more processing elements.

Example 20 includes the substance of the exemplary non-transitory machine-readable storage medium of Example 18, wherein, in response to determining that execution in the processor is not frontend bound, the set of machine learning-driven adaptation decision models is to generate the set of configuration parameters to cause the processor to reduce one or more of voltage and clock frequency of the frontend of the processor independent of the backend of the processor such that the frontend of the processor operates at one or more of a lower voltage and clock frequency in comparison to the backend of the processor.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system on a chip comprising:
   a processor; and
   a set of memory components that store instructions, which when executed by the processor cause the system on a chip to:
   generate, by a set of data collectors of a telemetry subsystem, a set of streams of telemetry metadata describing operation of the processor,
   forward one or more streams of telemetry metadata from the set of streams of telemetry metadata to a set of machine learning-driven adaptation decision models, wherein the set of machine learning-driven adaptation decision models is to determine whether execution in the processor is frontend bound or not frontend bound,
   receive, from the set of machine learning-driven adaptation decision models, a set of configuration parameters for controlling operation of the processor based on the one or more streams of telemetry metadata, and
   modify operation of the processor based on the set of configuration parameters,
   wherein, in response to determining that execution in the processor is not frontend bound, the set of machine learning-driven adaptation decision models is to generate the set of configuration parameters to cause the processor to disable one or more processing elements in a set of processing elements of the processor.

2. The system on a chip of claim 1, wherein modifying operation of the processor includes enabling the one or more processing elements in the set of processing elements of the processor.

3. The system on a chip of claim 1, wherein, in response to disabling the one or more processing elements, instructions to be processed by the processor are steered from the frontend of the processor to remaining enabled processing elements of the processor.

4. The system on a chip of claim 3, wherein disabling the set of processing elements of the processor includes routing state information of the one or more processing elements to the remaining enabled processing elements of the processor.

5. The system on a chip of claim 1, wherein the processing elements are one or more of out of order units and execution units.

6. The system on a chip of claim 1, wherein each processing element in the set of processing elements operates on a separate voltage plane and disabling the one or more processing elements includes turning off voltage from corresponding voltage planes for the one or more processing elements.

7. The system on a chip of claim 1, wherein, in response to determining that execution in the processor is not frontend bound, the set of machine learning-driven adaptation decision models is to generate the set of configuration parameters to cause the processor to reduce one or more of voltage and clock frequency of the frontend of the processor independent of the backend of the processor such that the frontend of the processor operates at one or more of a lower voltage and clock frequency in comparison to the backend of the processor.

8. A system for managing operation of a processor, the system comprising:
   a system on a chip, including a processor;
   a telemetry subsystem, including a set of data collectors to generate a set of streams of telemetry metadata describing operation of the processor; and
   a set of machine learning-driven adaptation decision models to generate a set of configuration parameters for controlling operation of the processor based on the one or more streams of telemetry metadata received from the telemetry subsystem, wherein operation of the processor is to be modified based on the set of configuration parameters received from the set of machine learning-driven adaptation decision models, wherein the set of machine learning-driven adaptation decision models is to determine whether execution in the processor is frontend bound or not frontend bound, and wherein, in response to determining that execution in the processor is not frontend bound, the set of machine learning-driven adaptation decision models is to generate the set of configuration parameters to cause the processor to disable one or more processing elements in a set of processing elements of the processor.

9. The system of claim 8, wherein modifying operation of the processor includes enabling the one or more processing elements in the set of processing elements of the processor.

10. The system of claim 8, wherein, in response to disabling the one or more processing elements, instructions to be processed by the processor are steered from the frontend of the processor to remaining enabled processing elements of the processor.

11. The system of claim 10, wherein disabling the set of processing elements of the processor includes routing state information of the one or more processing elements to the remaining enabled processing elements of the processor.

12. The system of claim 8, wherein the processing elements are one or more of out of order units and execution units.

13. The system of claim 8, wherein each processing element in the set of processing elements operates on a separate voltage plane and disabling the one or more processing elements includes turning off voltage from corresponding voltage planes for the one or more processing elements.

14. The system of claim 8, wherein, in response to determining that execution in the processor is not frontend bound, the set of machine learning-driven adaptation decision models is to generate the set of configuration parameters to cause the processor to reduce one or more of voltage and clock frequency of the frontend of the processor independent of the backend of the processor such that the frontend of the processor operates at one or more of a lower voltage and clock frequency in comparison to the backend of the processor.

15. A non-transitory machine-readable storage medium that includes instructions, which when executed by a processor, cause the processor to:

generate, by a set of data collectors of a telemetry subsystem, a set of streams of telemetry metadata describing operation of the processor;

forward, by the telemetry subsystem, one or more streams of telemetry metadata from the set of streams of telemetry metadata to a set of machine learning-driven adaptation decision models, wherein the set of machine learning-driven adaptation decision models is to determine whether execution in the processor is frontend bound or not frontend bound;

generate, by the set of machine learning-driven adaptation decision models, a set of configuration parameters for controlling operation of the processor based on the one or more streams of telemetry metadata;

forward, by the machine learning-driven adaptation decision models, the set of configuration parameters to the processor; and modify operation of the processor based on the set of configuration parameters, wherein, in response to determining that execution in the processor is not frontend bound, the set of machine learning-driven adaptation decision models is to generate the set of configuration parameters to cause the processor to disable one or more processing elements in a set of processing elements of the processor.

16. The non-transitory machine-readable storage medium of claim 15, wherein modifying operation of the processor includes enabling the one or more processing elements in the set of processing elements of the processor.

17. The non-transitory machine-readable storage medium of claim 15, wherein, in response to disabling the one or more processing elements, instructions to be processed by the processor are steered from the frontend of the processor to remaining enabled processing elements of the processor, wherein disabling the set of processing elements of the processor includes routing state information of the one or more processing elements to the remaining enabled processing elements of the processor, and wherein each processing element in the set of processing elements operates on a separate voltage plane and disabling the one or more processing elements includes turning off voltage from corresponding voltage planes for the one or more processing elements.

18. The non-transitory machine-readable storage medium of claim 15, wherein, in response to determining that execution in the processor is not frontend bound, the set of machine learning-driven adaptation decision models is to generate the set of configuration parameters to cause the processor to reduce one or more of voltage and clock frequency of the frontend of the processor independent of the backend of the processor such that the frontend of the processor operates at one or more of a lower voltage and clock frequency in comparison to the backend of the processor.

* * * * *